United States Patent
Lim et al.

(10) Patent No.: US 9,265,038 B2
(45) Date of Patent: Feb. 16, 2016

(54) METHOD FOR TRANSMITTING UPLINK SIGNAL TO MINIMIZE SPURIOUS EMISSION AND USER EQUIPMENT THEREOF

(71) Applicant: LG ELECTRONICS INC., Seoul (KR)

(72) Inventors: Suhwan Lim, Seoul (KR); Sangwook Lee, Seoul (KR); Jinyup Hwang, Seoul (KR); Dongik Lee, Seoul (KR); Manyoung Jung, Seoul (KR); Yoonoh Yang, Seoul (KR); Seungpyo Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 14/378,282

(22) PCT Filed: Mar. 25, 2014

(86) PCT No.: PCT/KR2014/002486
§ 371 (c)(1),
(2) Date: Aug. 12, 2014

(87) PCT Pub. No.: WO2014/157906
PCT Pub. Date: Oct. 2, 2014

(65) Prior Publication Data
US 2015/0289255 A1  Oct. 8, 2015

Related U.S. Application Data

(60) Provisional application No. 61/805,508, filed on Mar. 26, 2013, provisional application No. 61/884,127, filed on Sep. 29, 2013.

(30) Foreign Application Priority Data

Mar. 19, 2014  (KR) ........................ 10-2014-0032054

(51) Int. Cl.
*H04W 72/04* (2009.01)
*H04L 27/26* (2006.01)

(52) U.S. Cl.
CPC ........... *H04W 72/0413* (2013.01); *H04L 27/26* (2013.01); *H04W 72/0446* (2013.01)

(58) Field of Classification Search
None
See application file for complete search history.

(56) References Cited

U.S. PATENT DOCUMENTS

2010/0118805 A1* 5/2010 Ishii .................... H04W 52/367
370/329
2011/0261782 A1 10/2011 Nakano et al.
(Continued)

FOREIGN PATENT DOCUMENTS

EP        1763268 A1    3/2007
JP     2007-116674 A    5/2007
(Continued)

*Primary Examiner* — Ian N Moore
*Assistant Examiner* — Brian T Le
(74) *Attorney, Agent, or Firm* — Birch, Stewart, Kolasch & Birch, LLP

(57) ABSTRACT

A method for limiting a spurious emission; and a user equipment (UE) therefore are discussed. The method according to one embodiment includes, if a radio frequency (RF) unit of the UE is configured to use a band 1, configuring the RF unit of the UE to limit a maximum level of spurious emission to −50 dBm for protecting other UE using a band 5; if the RF unit of the UE is configured to use the band 5, configuring the RF unit of the UE to limit the maximum level of spurious emission to −50 dBm for protecting the other UE using at least one of bands 1, 3, 7, 8, 38, 40; and transmitting an uplink signal through the configured RF unit.

15 Claims, 18 Drawing Sheets

(56) References Cited

U.S. PATENT DOCUMENTS

2011/0319119 A1* 12/2011 Ishii ................... H04L 5/0007
455/522
2013/0028214 A1* 1/2013 Imamura ............... H04L 5/001
370/329

FOREIGN PATENT DOCUMENTS

| JP | 2010-154369 A | 7/2010 |
|---|---|---|
| KR | 10-2008-0094254 A | 10/2008 |
| WO | WO 2010/144182 A1 | 12/2010 |

* cited by examiner

METHOD FOR TRANSMITTING UPLINK SIGNAL TO MINIMIZE SPURIOUS EMISSION AND USER EQUIPMENT THEREOF

CROSS REFERENCE TO RELATED APPLICATIONS

This application is the National Phase of PCT International Application No. PCT/KR2014/002486, filed on Mar. 25, 2014, which claims priority under 35 U.S.C. 119(e) to U.S. Provisional Application Nos. 61/805,508, filed on Mar. 26, 2013 and 61/884,127, filed on Sep. 29, 2013 and under 35 U.S.C. 119(a) to Patent Application No. 10-2014-0032054, filed in the Republic of Korea on Mar. 19, 2014, all of which are hereby expressly incorporated by reference into the present application.

TECHNICAL FIELD

The present invention relates to a method for transmitting an uplink signal to minimize spurious emission and user equipment thereof.

BACKGROUND ART

3GPP (3rd Generation Partnership Project) LTE (Long Term Evolution) that is an advancement of UMTS (Universal Mobile Telecommunication System) is being introduced with 3GPP release 8.

In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

FIG. 1 illustrates a 3GPP LTE wireless communication system.

As can be seen from FIG. 1, the wireless communication system includes at least one base station (BS) 20. Each base station 20 offers a communication service in a specific geographical area (generally denoted cell) 20a, 20b, and 20c.

At this time, communication from the base station to a terminal is denoted downlink (DL), and communication from the terminal to the base station is denoted uplink (UL).

If the BSs 20 provided from a plurality of service providers is located at respective geographical regions 15a, 15b, and 15c, the BSs 20 may interfere with each other.

In order to prevent the interference, the respective service providers may provide a service with different frequency bands.

However, when the frequency bands of the respective service providers are close to each other, the interference problem remains.

DISCLOSURE OF INVENTION

Technical Problem

Accordingly, the disclosures in the specification a method for transmitting an uplink signal to minimize a spurious emission capable of limiting a maximum level with respect to the spurious emission leaked to a neighboring band, and user equipment thereof.

Solution to Problem

To achieve these and other advantages and in accordance with the purpose of the present disclosure, as embodied and broadly described herein, there is provided a method for limiting a spurious emission, the method performed by a user equipment (UE). The method may comprise: if a radio frequency (RF) unit of the UE is configured to use a 3GPP standard based E-UTRA band 1, configuring a RF unit of the UE to limit a maximum level of spurious emission to −50 dBm for protecting other UE using a 3GPP standard based E-UTRA band 5 in order to apply a UE-to-UE coexistence requirement for the same region to inter-regions; if the RF unit is configured to use the 3GPP standard based E-UTRA band 5, configuring the RF unit of the UE to limit a maximum level of spurious emission to −50 dBm for protecting other UE using at least one of the 3GPP standard based E-UTRA bands 1, 3, 7, 8, 38, 40 in order to apply a UE-to-UE coexistence requirement for the same region to inter-regions; and transmitting an uplink signal through the configured RF unit.

When the RF unit aggregates inter-band carriers of the band 1 and the band 5, the RF unit may be configured to limit the maximum level of the spurious emission to −50 dBm.

The method may further comprise: comprising receiving setting carrier aggregation of the 3GPP standard based E-UTRA bands 1 and 5.

The method may further comprise receiving system information. The system information comprises information on at least one of the 3GPP standard based E-UTRA bands 1 and 5.

To achieve these and other advantages and in accordance with the purpose of the present disclosure, as embodied and broadly described herein, there is provided a wireless apparatus for transmitting an uplink signal. The wireless apparatus may comprise: a processor; and a radio frequency (RF) unit controllable by the processor and configured to transmit an uplink signal. Here, if the RF unit is configured to use a 3GPP standard based E-UTRA band 1, a maximum level of spurious emission may be limited to −50 dBm for protecting other UE using a 3GPP standard based E-UTRA band 5 in order to apply a UE-to-UE coexistence requirement for the same region to inter-regions. Also, if the RF unit is configured to use the 3GPP standard based E-UTRA band 5, a maximum level of spurious emission may be limited to −50 dBm for protecting other UE using at least one of the 3GPP standard based E-UTRA bands 1, 3, 7, 8, 38, 40 in order to apply a UE-to-UE coexistence requirement for the same region to inter-regions.

When the RF unit aggregates inter-band carriers of the band 1 and the band 5, the RF unit may be configured to limit the maximum level of the spurious emission to −50 dBm.

The RF unit may receive setting carrier aggregation of the 3GPP standard based E-UTRA bands 1 and 5.

The RF unit may receive system information, and the system information comprises information on at least one of the 3GPP standard based E-UTRA bands 1 and 5.

To achieve these and other advantages and in accordance with the purpose of the present disclosure, as embodied and broadly described herein, there is provided a method for limiting a spurious emission, the method performed by a user equipment (UE). The method may comprise: receiving a configuration on carrier aggregation of 3GPP standard based E-UTRA bands 1 and 5; and if a number of RBs in each of the bands 1 and 5 are equal to or less than 100, configuring the RF unit to limit a maximum level of spurious emission to −50 dBm in order to protect at least one of 3GPP standard based E-UTRA band 1, 3, 5, 7, 8, 38, 40, 42.

The method may further comprise: configuring the RF unit to limit the maximum level of the spurious emission to −27 dBm for protecting an E-UTRA band 26.

The method may further comprise: configuring the RF unit of the UE to limit the maximum level of the spurious emission to −37 dBm for protecting an E-UTRA band 28.

The method may further comprise receiving system information. Here, the system information may comprise information on at least one of the 3GPP standard based E-UTRA bands 1 and 5.

To achieve these and other advantages and in accordance with the purpose of the present disclosure, as embodied and broadly described herein, there is provided a wireless apparatus for transmitting an uplink signal. The wireless apparatus may comprise: a processor; and a radio frequency (RF) unit controllable by the processor and configured to transmit an uplink signal. Here, if the RF unit is configured to aggregate 3GPP standard based E-UTRA bands 1 and 5, and if a number of RBs in each of the bands 1 and 5 may be equal to or less than 100, a maximum level of spurious emission is limited to −50 dBm to protect at least one of 3GPP standard based E-UTRA band 1, 3, 5, 7, 8, 38, 40, 42.

The RF unit may be configured to limit the maximum level of the spurious emission to −27 dBm for protecting an E-UTRA band 26.

The RF unit may be configured to limit the maximum level of the spurious emission to −37 dBm for protecting an E-UTRA band 28.

Advantageous Effects of Invention

According to the present invention, since the spurious emission leaked to a neighboring band may be reduced, interference with a neighboring channel can be reduced.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

MODE FOR THE INVENTION

Figure 1:
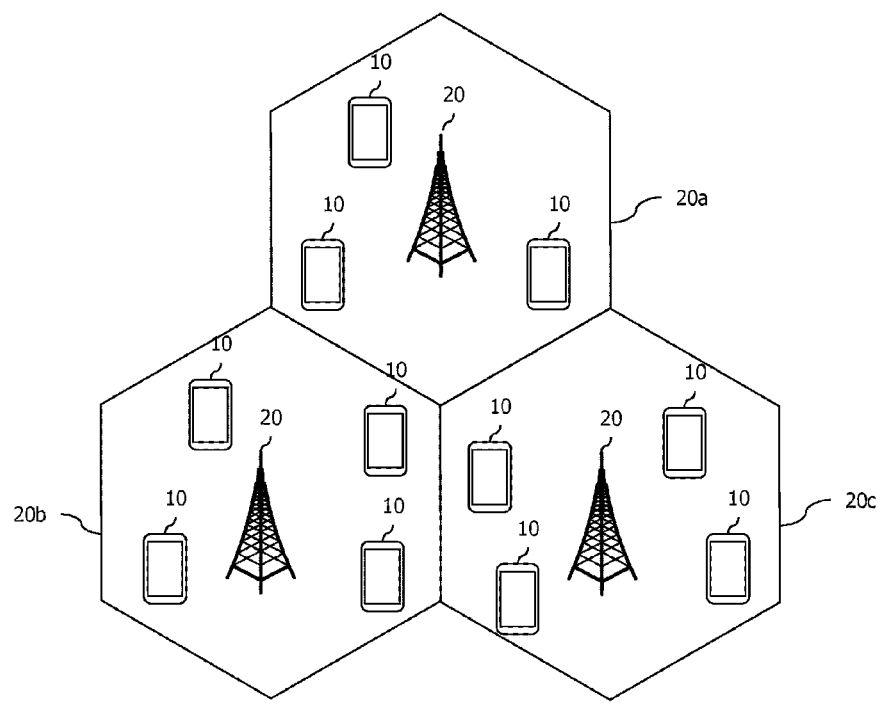
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

Meanwhile, the LTE system defined by the 3GPP adopted such MIMO. Hereinafter, the LTE system is described in further detail.

Figure 2:
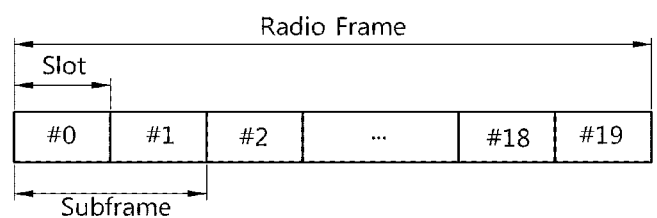
FIG. 2 illustrates the architecture of a radio frame according to FDD in 3GPP LTE.

FIG. 2 illustrates the architecture of a radio frame according to FDD in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, the radio frame consists of 10 sub-frames, and each sub-frame includes two slots. The slots in the radio frame are numbered with slot numbers 0 to 19. The time taken for one sub-frame to be transmitted is denoted TTI (transmission time interval). The TTI may be a scheduling unit for data transmission. For example, the length of one radio frame is 10 ms, the length of one sub-frame is 1 ms, and the length of one slot may be 0.5 ms.

The architecture of radio frame is merely an example, and the number of sub-frames in the radio frame or the number of slots in each sub-frame may be changed variously.

Meanwhile, one slot may include a plurality of OFDM symbols. How many OFDM symbols are included in one slot may vary depending on cyclic prefix (CP).

Figure 3:
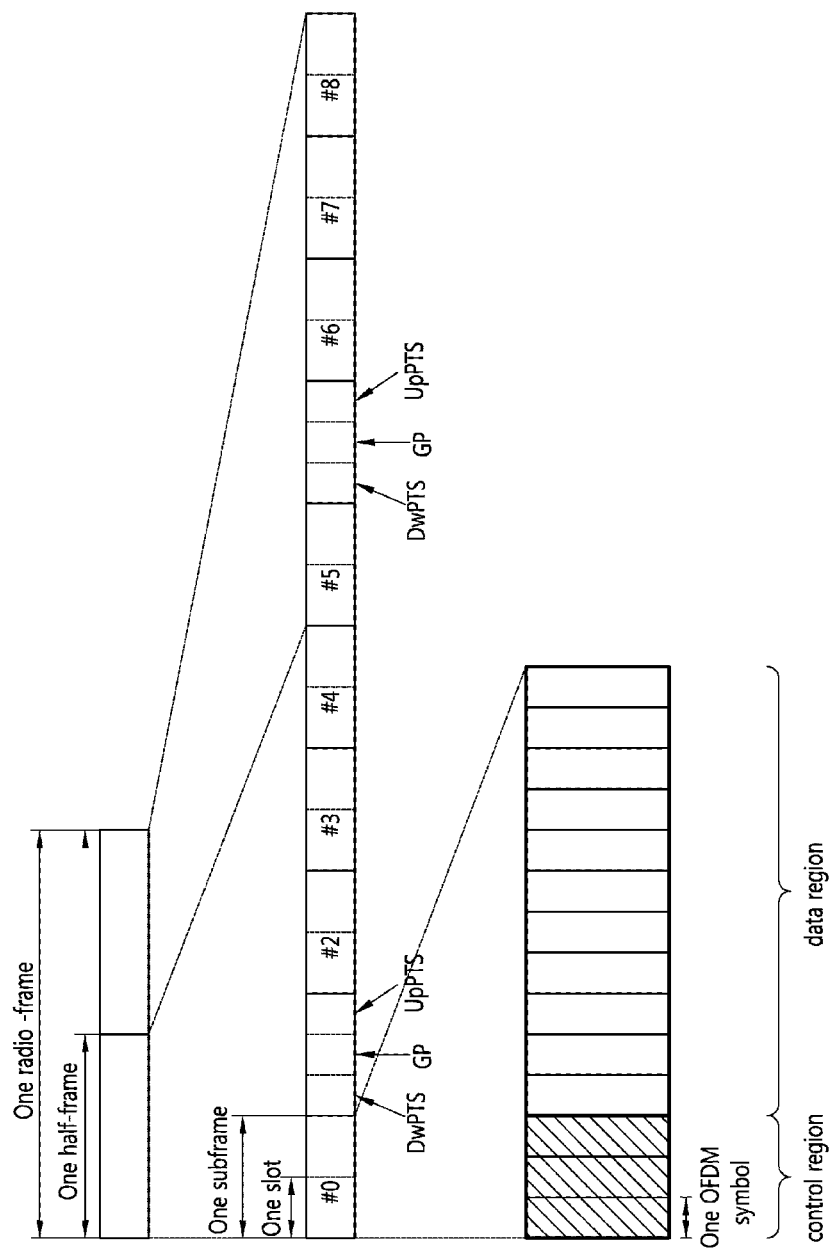
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Config-uraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
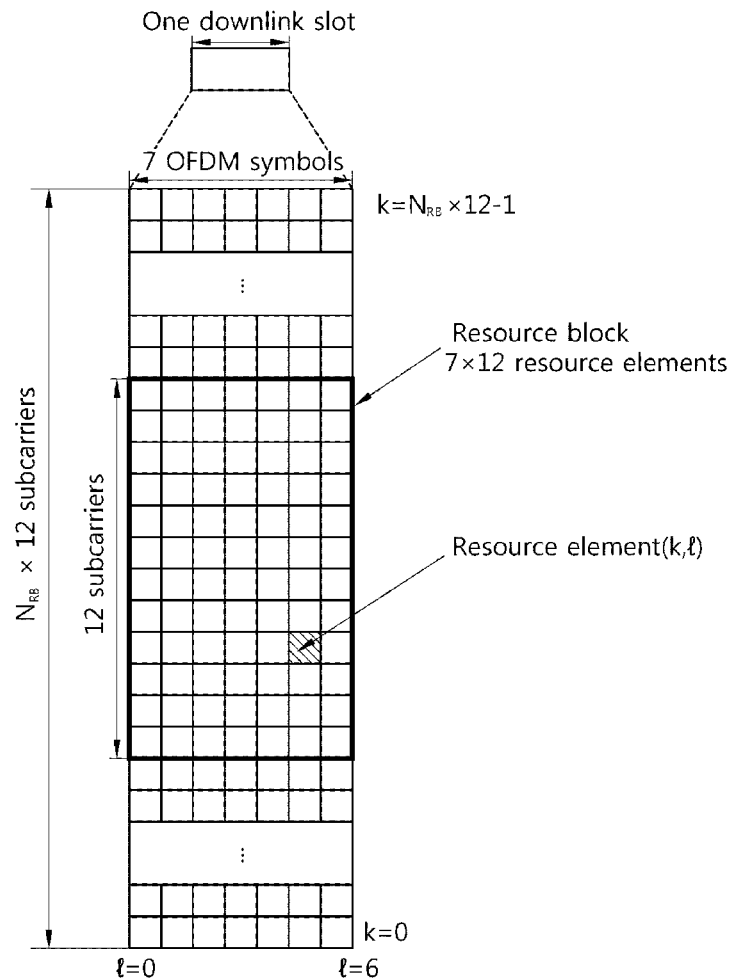
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period.

The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
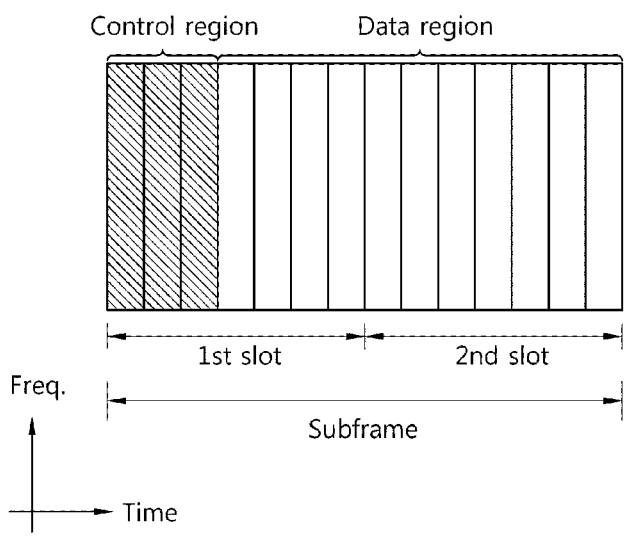
FIG. 5 illustrates the architecture of a downlink sub-frame.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
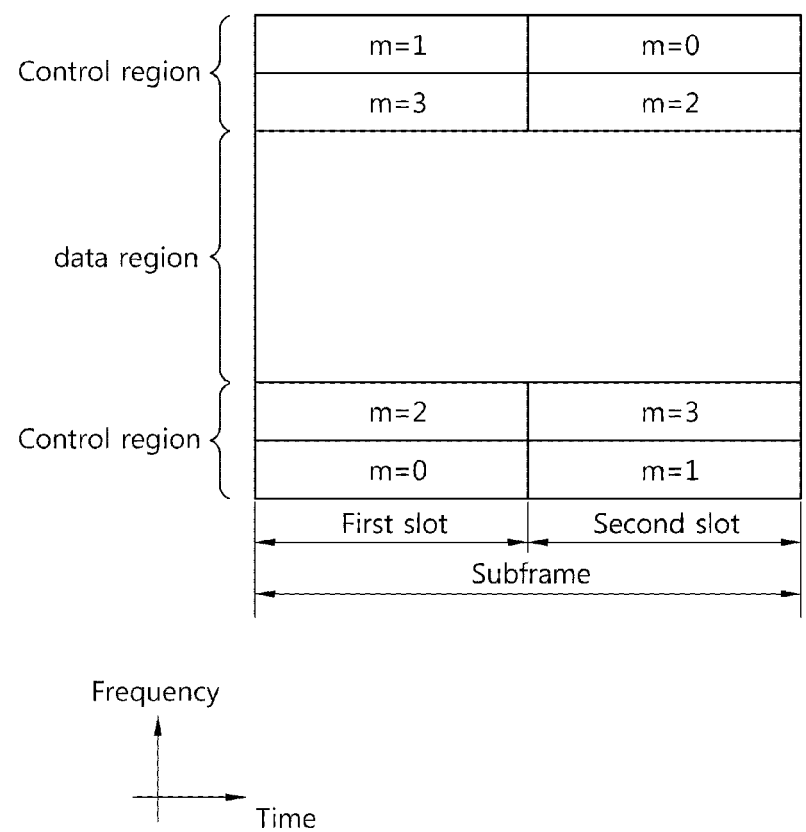
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Meanwhile, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred to as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, the 3GPP is devoting its energy to standardizing LTE-Advanced that is an evolutional version of LTE, and the clustered DFT-s-OFDM scheme has been adopted which permits non-contiguous resource allocation.

The clustered DFT-s OFDM transmission scheme is a variation of the existing SC-FDMA transmission scheme, and in this scheme, data symbols that have undergone a precoder are split into a plurality of sub-blocks that are mapped, separated from each other in the frequency domain.

Meanwhile, the LTE-A system is described in further detail.

A major feature of the clustered DFT-s-OFDM scheme is to enable frequency-selective resource allocation so as to flexibly deal with a frequency selective fading environment.

At this time, in the clustered DFT-s-OFDM scheme adopted as uplink access scheme in LTE-Advanced, unlike SC-FDMA that is a conventional LTE uplink access scheme, non-contiguous resource allocation is allowed, so that uplink data transmitted may be split into several cluster units.

That is, while the LTE system is configured to maintain the single carrier characteristic in the case of uplink, the LTE-A system permits DFT_precoded data to be assigned along the frequency axis in a non-contiguous way or both a PUSCH and a PUCCH to be transmitted at the same time. In such case, it is difficult to maintain the single carrier characteristic.

A carrier aggregation system is now described.

Figure 7:
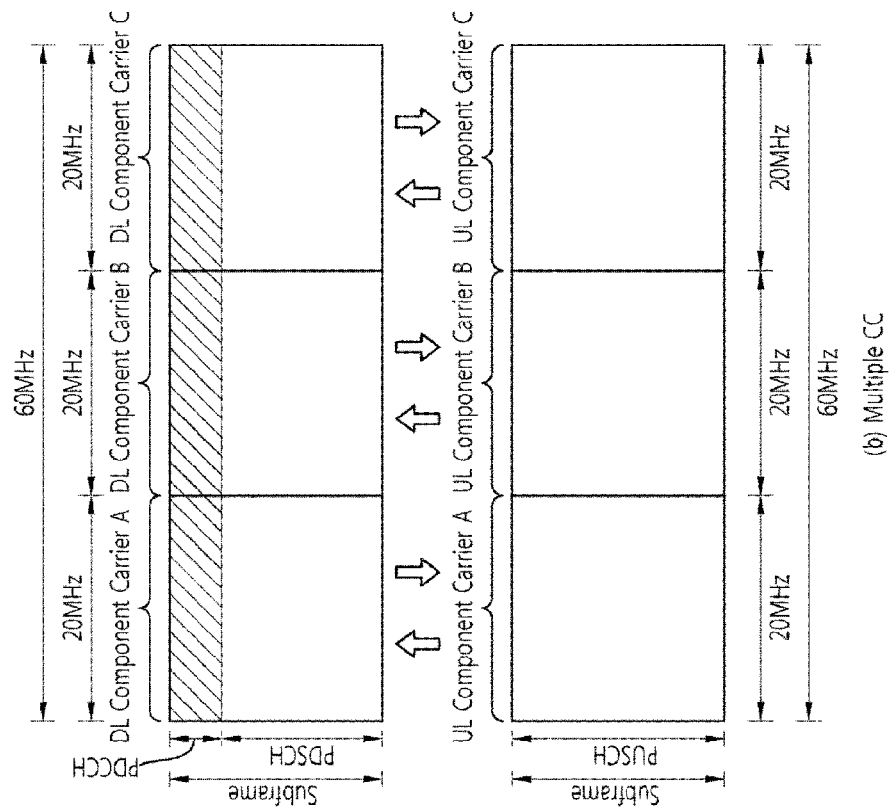
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC (carrier #0)+20 MHz CC (carrier #1)+20 MHz CC (carrier #2)+20 MHz CC (carrier #3)+5 MHz CC (carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
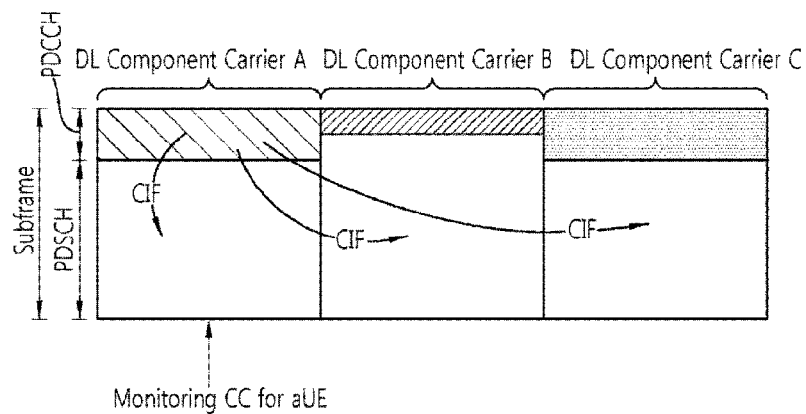
FIG. 8 illustrates an example of cross-carrier scheduling in a carrier aggregation system.

FIG. 8 illustrates an example of cross-carrier scheduling in a carrier aggregation system.

Referring to FIG. 8, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set.

In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 8, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Figure 9:
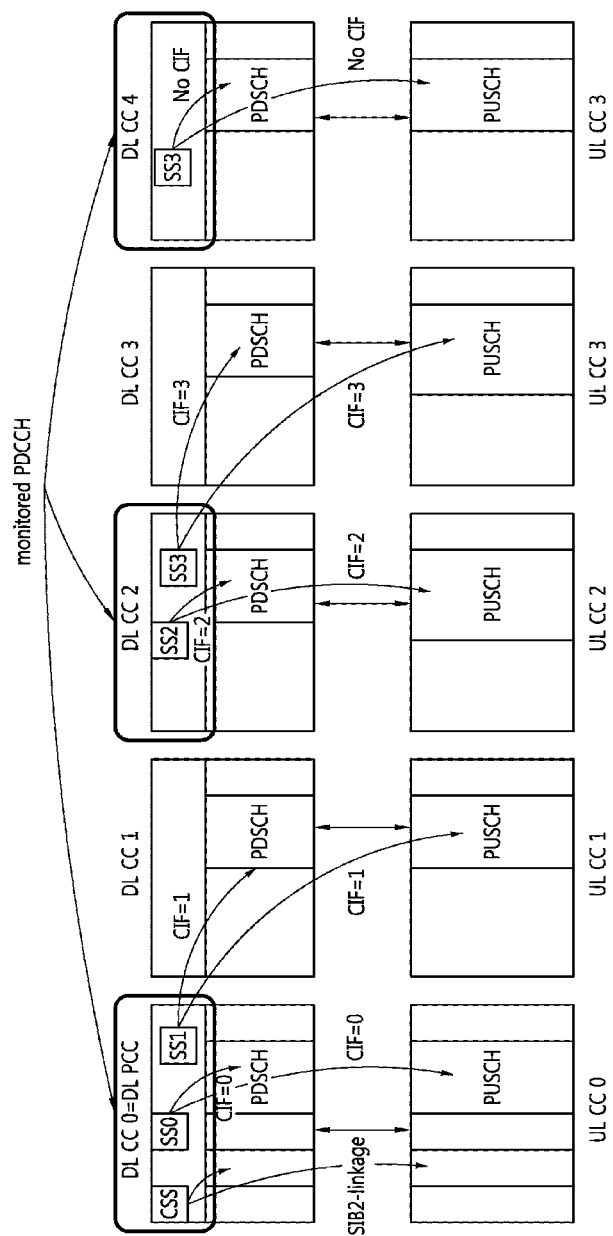
FIG. 9 illustrates example scheduling when cross-carrier scheduling is configured in a carrier aggregation system.

FIG. 9 illustrates example scheduling when cross-carrier scheduling is configured in a carrier aggregation system.

Referring to FIG. 9, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 10:
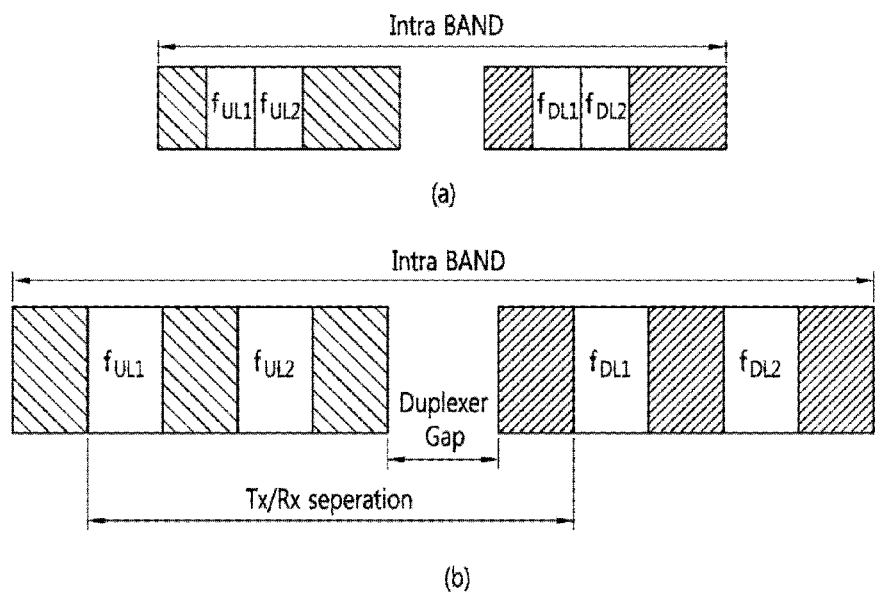
FIG. 10 is a concept view illustrating intra-band carrier aggregation (CA).

FIG. 10 is a concept view illustrating intra-band carrier aggregation (CA).

FIG. 10(a) illustrates intra-band contiguous CA, and FIG. 10(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 10(a) and the intra-band non-contiguous CA shown in FIG. 10(b).

Figure 11:
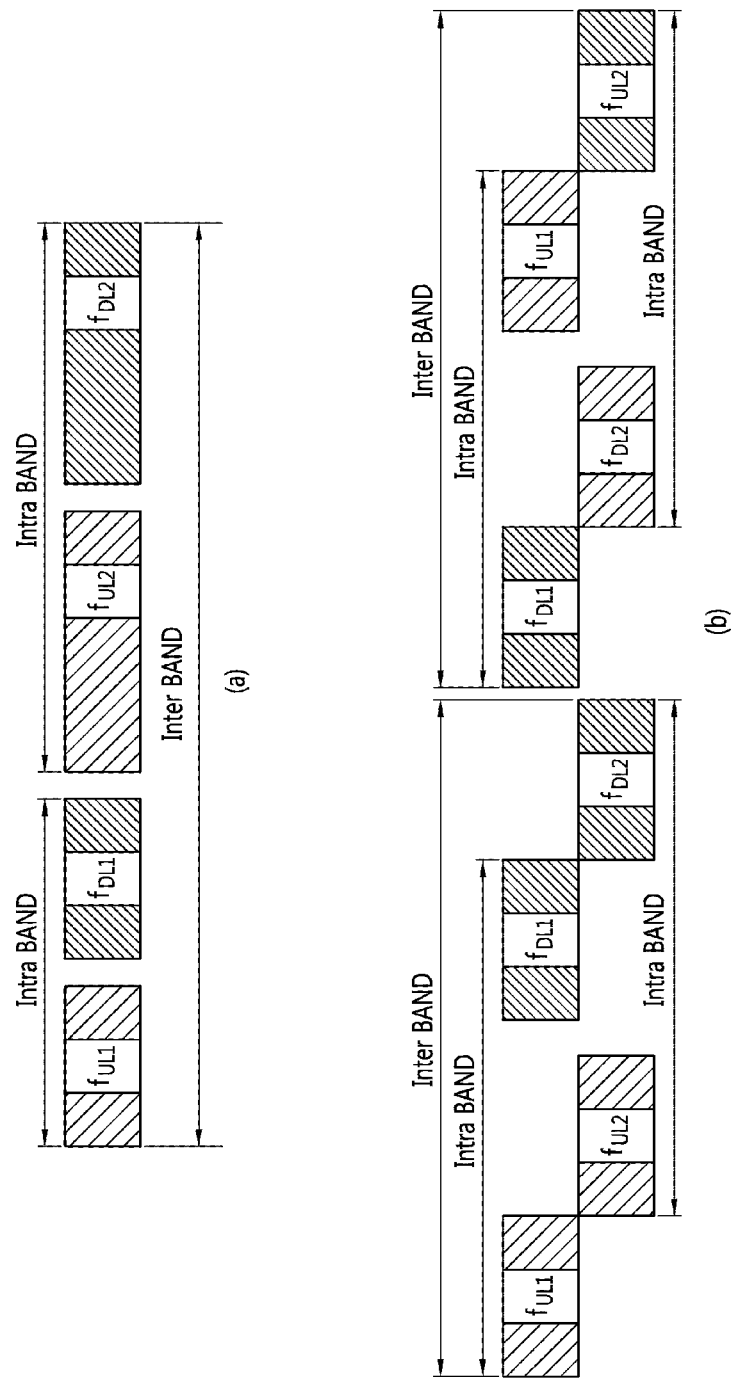
FIG. 11 is a concept view illustrating inter-band carrier aggregation.

FIG. 11 is a concept view illustrating inter-band carrier aggregation.

FIG. 11(a) illustrates a combination of a lower band and a higher band for inter-band CA, and FIG. 11(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 11(a) and inter-band CA of similar frequencies that may use a common RF terminal per component carrier due to similar RF (radio frequency) characteristics as shown in FIG. 11(b).

TABLE 2

| Operating Band | Uplink (UL) operating band $F_{UL\_low}$-$F_{UL\_high}$ | | Downlink (DL) operating band $F_{DL\_low}$-$F_{DL\_high}$ | | Duplex Mode |
| --- | --- | --- | --- | --- | --- |
| 1 | 1920 MHz | 1980 MHz | 2110 MHz | 2170 MHz | FDD |
| 2 | 1850 MHz | 1910 MHz | 1930 MHz | 1990 MHz | FDD |

TABLE 2-continued

| Operating Band | Uplink (UL) operating band $F_{UL\_low}$-$F_{UL\_high}$ | | Downlink (DL) operating band $F_{DL\_low}$-$F_{DL\_high}$ | | Duplex Mode |
|---|---|---|---|---|---|
| 3 | 1710 MHz | 1785 MHz | 1805 MHz | 1880 MHz | FDD |
| 4 | 1710 MHz | 1755 MHz | 2110 MHz | 2155 MHz | FDD |
| 5 | 824 MHz | 849 MHz | 869 MHz | 894 MHz | FDD |
| 6 | 830 MHz | 840 MHz | 875 MHz | 885 MHz | FDD |
| 7 | 2500 MHz | 2570 MHz | 2620 MHz | 2690 MHz | FDD |
| 8 | 880 MHz | 915 MHz | 925 MHz | 960 MHz | FDD |
| 9 | 1749.9 MHz | 1784.9 MHz | 1844.9 MHz | 1879.9 MHz | FDD |
| 10 | 1710 MHz | 1770 MHz | 2110 MHz | 2170 MHz | FDD |
| 11 | 1427.9 MHz | 1447.9 MHz | 1475.9 MHz | 1495.9 MHz | FDD |
| 12 | 699 MHz | 716 MHz | 729 MHz | 746 MHz | FDD |
| 13 | 777 MHz | 787 MHz | 746 MHz | 756 MHz | FDD |
| 14 | 788 MHz | 798 MHz | 758 MHz | 768 MHz | FDD |
| 15 | Reserved | | Reserved | | FDD |
| 16 | Reserved | | Reserved | | FDD |
| 17 | 704 MHz | 716 MHz | 734 MHz | 746 MHz | FDD |
| 18 | 815 MHz | 830 MHz | 860 MHz | 875 MHz | FDD |
| 19 | 830 MHz | 845 MHz | 875 MHz | 890 MHz | FDD |
| 20 | 832 MHz | 862 MHz | 791 MHz | 821 MHz | FDD |
| 21 | 1447.9 MHz | 1462.9 MHz | 1495.9 MHz | 1510.9 MHz | FDD |
| 22 | 3410 MHz | 3490 MHz | 3510 MHz | 3590 MHz | FDD |
| 23 | 2000 MHz | 2020 MHz | 2180 MHz | 2200 MHz | FDD |
| 24 | 1626.5 MHz | 1660.5 MHz | 1525 MHz | 1559 MHz | FDD |
| 25 | 1850 MHz | 1915 MHz | 1930 MHz | 1995 MHz | FDD |
| 26 | 814 MHz | 849 MHz | 859 MHz | 894 MHz | FDD |
| 27 | 807 MHz | 824 MHz | 852 MHz | 869 MHz | FDD |
| 28 | 703 MHz | 748 MHz | 758 MHz | 803 MHz | FDD |
| 29 | N/A | N/A | 717 MHz | 728 MHz | FDD |
| 30 | 2305 MHz | 2315 MHz | 2350 MHz | 2360 MHz | FDD |
| 31 | 452.5 MHz | 457.5 MHz | 462.5 MHz | 467.5 MHz | FDD |
| ... | | | | | |
| 33 | 1900 MHz | 1920 MHz | 1900 MHz | 1920 MHz | TDD |
| 34 | 2010 MHz | 2025 MHz | 2010 MHz | 2025 MHz | TDD |
| 35 | 1850 MHz | 1910 MHz | 1850 MHz | 1910 MHz | TDD |
| 36 | 1930 MHz | 1990 MHz | 1930 MHz | 1990 MHz | TDD |
| 37 | 1910 MHz | 1930 MHz | 1910 MHz | 1930 MHz | TDD |
| 38 | 2570 MHz | 2620 MHz | 2570 MHz | 2620 MHz | TDD |
| 39 | 1880 MHz | 1920 MHz | 1880 MHz | 1920 MHz | TDD |
| 40 | 2300 MHz | 2400 MHz | 2300 MHz | 2400 MHz | TDD |
| 41 | 2496 MHz | 2690 MHz | 2496 MHz | 2690 MHz | TDD |
| 42 | 3400 MHz | 3600 MHz | 3400 MHz | 3600 MHz | TDD |
| 43 | 3600 MHz | 3800 MHz | 3600 MHz | 3800 MHz | TDD |
| 44 | 703 MHz | 803 MHz | 703 MHz | 803 MHz | TDD |

Meanwhile, the 3GPP LTE/LTE-A systems define operating bands for uplink and downlink as shown in Table 2 above. Four CA cases shown in FIG. 11 come from Table 2.

Here, FUL_low means the lowest frequency in the uplink operating bands. FUL_high means the highest frequency in the uplink operating bands. Further, FDL_low means the lowest frequency in the downlink operating bands, and FDL_high means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB, agg} = 100$ | 1 | $0.05 BW_{Channel(1)}$ |
| B | $N_{RB, agg} = 100$ | 2 | FFS |
| C | $100 < N_{RB, agg} = 200$ | 2 | $0.05 \max(BW_{Channel(1)}, BW_{Channel(2)})$ |
| D | $200 < N_{RB, agg} = [300]$ | FFS | FFS |
| E | $[300] < N_{RB, agg} = [400]$ | FFS | FFS |
| F | $[400] < N_{RB, agg} = [500]$ | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

E-UTRA CA configuration/Bandwidth combination set

| E-UTRA CA configuration | 50 RB + 100 RB(10 MHz + 20 MHz) | 75 RB + 75 RB(15 MHz + 15 MHz) | 75 RB + 100 RB(15 MHz + 20 MHz) | 100 RB + 100 RB(20 MHz + 20 MHz) | Maximum aggregated bandwidth [MHz] | Bandwidth Combination Set |
|---|---|---|---|---|---|---|
| CA_1C |  | Yes |  | Yes | 40 | 0 |
| CA_7C |  | Yes |  | Yes | 40 | 0 |
| CA_38C |  | Yes |  | Yes | 40 | 0 |
| CA_40C | Yes | Yes |  | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

Figure 12:
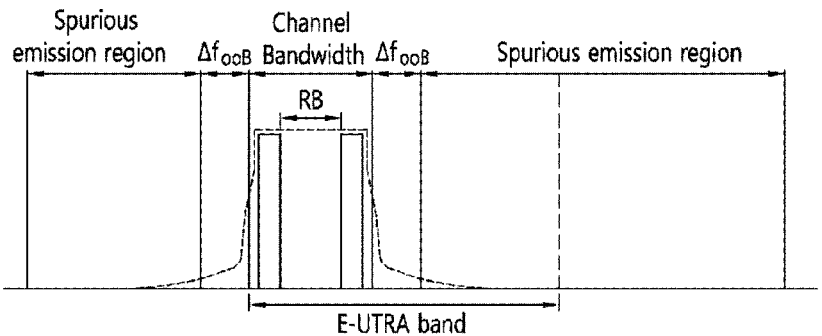
FIG. 12 illustrates the concept of unwanted emission.
Figure 13:
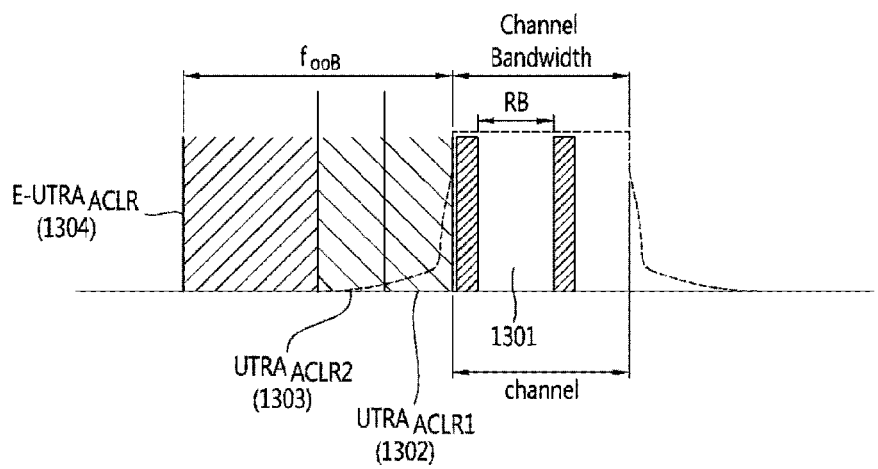
FIG. 13 specifically illustrates out-of-band emission of the unwanted emission shown in FIG. 12.
Figure 14:
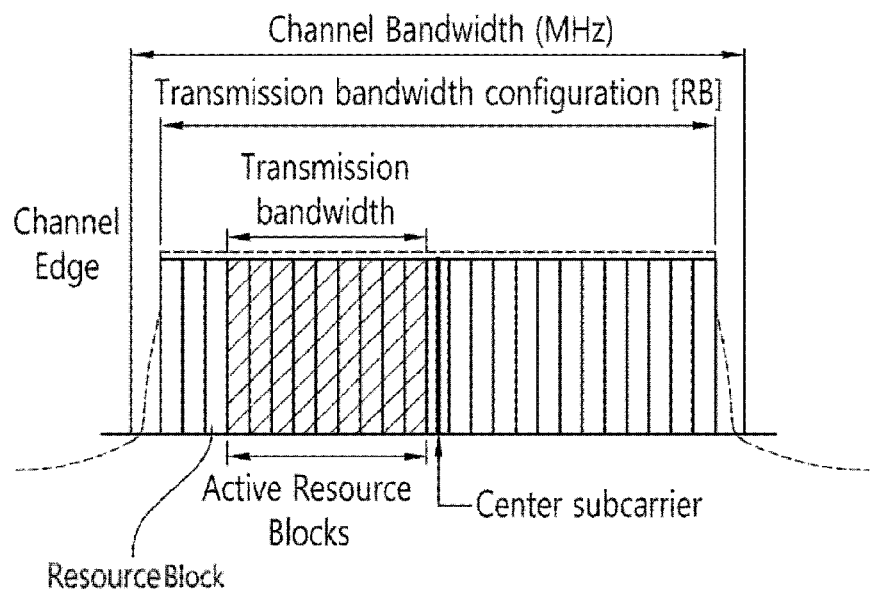
FIG. 14 illustrates a relationship between the resource block RB and channel band (MHz) shown in FIG. 12.

FIG. 12 illustrates the concept of unwanted emission. FIG. 13 specifically illustrates out-of-band emission of the unwanted emission shown in FIG. 12. FIG. 14 illustrates a relationship between the resource block RB and channel band (MHz) shown in FIG. 12.

As can be seen from FIG. 12, a transmission modem sends a signal over a channel bandwidth assigned in an E-UTRA band.

Here, the channel bandwidth is defined as can be seen from FIG. 14. That is, a transmission bandwidth is set to be smaller than the channel bandwidth (BWChannel). The transmission bandwidth is set by a plurality of resource blocks (RBs). The outer edges of the channel are the highest and lowest frequencies that are separated by the channel bandwidth.

Meanwhile, as described above, the 3GPP LTE system supports channel bandwidths of 1.4 MHz, 3 MHz, 5 MHz, 10 MHz, 15 MHz, and 20 MHz. The relationship between such channel bandwidths and the number of resource blocks is as below.

TABLE 5

| | Channel bandwidth $BW_{Channel}$ [MHz] | | | | | |
|---|---|---|---|---|---|---|
| | 1.4 | 3 | 5 | 10 | 15 | 20 |
| Transmission bandwidth settings $N_{RB}$ | 6 | 15 | 25 | 50 | 75 | 100 |

Turning back to FIG. 12, unwanted emission arises in the band of $f_{OOB}$, and as shown, unwanted emission also occurs on the spurious area. Here, $f_{OOB}$ means the magnitude in the out-of-band (OOB). Meanwhile, the out-of-band omission refers to the one that arises in a band close to an intended transmission band. The spurious emission means that unwanted waves spread up to a frequency band that is far away from the intended transmission band.

Meanwhile, 3GPP release 10 defines basic SE (spurious emission) that should not be exceeded according to a frequency range.

In the meantime, as illustrated in FIG. 13, if transmission is conducted in the E-UTRA channel band 1301, leakage, i.e., unwanted emission, occurs to out-of-bands (1302, 1303, and 1304 in the shown $f_{OOB}$ area).

Here, $UTRA_{ACLR1}$ denotes a ratio of leakage to a channel 1302 to an E-UTRA channel 1301, i.e., an adjacent channel leakage ratio, in case the adjacent channel 1302 is the one for UTRA when a terminal conducts transmission on the E-UTRA channel 1301. $UTRA_{ACLR2}$ is a ratio of leakage to a channel 1303 (a UTRA channel) located to the adjacent channel 1302, i.e., an adjacent channel leakage ratio, in case the channel 1303 is the one for UTRA, as shown in FIG. 13. $E-UTRA_{ACLR}$ is a ratio of leakage to an adjacent channel 1304 (i.e., an E-UTRA channel) when the terminal conducts transmission through the E-UTRA channel 1301, i.e., an adjacent channel leakage ratio.

As set forth above, if transmission is conducted in an assigned channel band, unwanted emission occurs to adjacent channels.

As described above, unwanted emission arises to bands adjacent to each other. At this time, with respect to interference caused by transmission from the base station, the amount of interference to adjacent bands may be reduced to an allowed reference or less by designing a high-price and bulky RF filter in view of the base station's nature. On the contrary, in the case of the terminal, it is difficult to completely prevent interference to adjacent bands due to, e.g., the limited size of terminal and limited price of the power amplifier or pre-duplex filter RF device.

Accordingly, the terminal s transmission power needs to be limited.

In the LTE system, a maximum power Pcmax in the UE is simply expressed as follows.

MathFigure 1

$$P\text{cmax}=\text{Min}(Pe\text{max}, Pu\text{max})$$ [Math.1]

Where, the Pcmax represents maximum power (actual maximum transmission power) where the UE may transmit in a corresponding cell, and the Pemax represents usable maximum power in a corresponding cell to which the BS signals. Further, the Pumax represents maximum power ($P_{PowerClass}$) of the UE on which Maximum Power Reduction (hereinafter referred to as "MPR") and Additive-MPR (hereinafter referred to as "A-MPR") are considered.

The maximum power $P_{PowerClass}$ of the UE is listed in a following table 6.

TABLE 6

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 19, 20, 21, 22, 23, 24, 25, 26, 27, 28, 30, 31, 33, 34, 35, 36, 37, 38, 39, 40, 41, 42, 43, 44 |  | 23 dBm |
| 14 | 31 dBm |  |

Meanwhile, in a case of intra-band continuous CA. maximum power PPowerClass of the UE is listed in a following table 7.

TABLE 7

| Operating Band | Power class 3 (dBm) |
|---|---|
| CA_1C | 23 dBm |
| CA_3C | 23 dBm |
| CA_7C | 23 dBm |
| CA_38C | 23 dBm |
| CA_40C | 23 dBm |
| CA_41C | 23 dBm |

Figure 15:
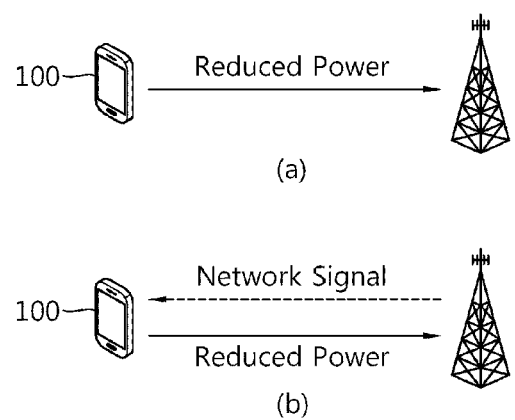
FIG. 15 illustrates an example of a method of limiting transmission power of a terminal.

FIG. 15 illustrates an example of a method of limiting transmission power of a terminal.

As can be seen from FIG. 15(a), the terminal 100 conducts transmission with transmission power limited In case a PAPR (peak-to-average power ratio) is increased, linearity of the power amplifier (PA) is reduced, as an MPR (maximum power reduction) value for limiting transmission power, an MPR value up to 2 dB may apply depending on modulation schemes in order to maintain such linearity. This is shown in the following table.

TABLE 8

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | =1 |
| 16 QAM | =5 | =4 | =8 | =12 | =16 | =18 | =1 |
| 16 QAM | >5 | >4 | >8 | >12 | >16 | >18 | =2 |

Table 6 above represents MPR values for power classes 1 and 3.

<MPR Per 3GPP Release 11>

Meanwhile, according to 3GPP release 11, the terminal adopts multi-cluster transmission in a single CC (component carrier) and may simultaneously transmit a PUSCH and a PUCCH. As such, if the PUSCH and the PUCCH are transmitted at the same time, the size of the IM3 component (which means a distortion signal generated by intermodulation) that occurs at an out-of-band area may be increased as compared with the existing size, and this may serve as larger interference to an adjacent band. Thus, the following MPR value may be set so as to meet general spurious emission, ACLR (adjacent channel leakage ratio) and general SEM (spectrum emission mask) that are the terminal's emission requirements that should be observed by the terminal upon uplink transmission.

MathFigure 2

$$MPR=CEIL\{M_A, 0.5\}$$ [Math.2]

Here, $M_A$ is as follows.

$M_A$=[8.0]–[10.12]A; 0<A=[0.33]

[5.67]–[3.07]A [0.33]<A=[0.77]

[3.31]; [0.77]<A=[1.0]

Here A is as follows.

$A=N_{RB\_alloc}/N_{RB}$.

$N_{RB\_agg}$ is the number of RBs in the channel band, and $N_{RB\_alloc}$ is the total number of RBs that are transmitted at the same time.

CEIL$\{M_A, 0.5\}$ is a function that rounds off on a per-0.5 dB basis. That is, MPR∈[3.0, 3.5 4.0 4.5 5.0 5.5 6.0 6.5 7.0 7.5 8.0].

The MPR value shown in Equation 2 above is the one that applies when a general PA (power amplifier) is used. If a high efficiency power amplifier (HEPA) that is recently being researched is used, an MPR value of a higher level may be needed. However, despite its advantage that it may reduce power consumption and heat radiation by 30% or more, the HEPA suffers from reduced cell coverage that comes from demand of a larger MPR value. Further, since linearity is guaranteed only up to 20 MHz to date, linearity is not insured considering carrier aggregation (CA).

<General MPR>

Taking the CA into account, the channel bandwidth of uplink, meanwhile, may be increased up to 40 MHz (20 MH+20 MHz), and accordingly, a larger MPR value is needed.

TABLE 9

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| QPSK | >12 and =50 | >16 and =75 | >16 and =75 | >18 and =100 | =1 |
| QPSK | >50 | >75 | >75 | >100 | =2 |
| 16 QAM | =12 | =16 | =16 | =18 | =1 |
| 16 QAM | >12 and =50 | >16 and =75 | >16 and =75 | >18 and =100 | =2 |
| 16 QAM | >50 | >75 | >75 | >100 | =3 |

Table 9 above represents MPR values for power class 3.

As in Table 9, in the case of class C of intra contiguous CA, an MPR value up to 3 dB may apply depending on modulation schemes. Meanwhile, under the environment of CA class C, the MPR value as follows should be met considering multi-cluster transmission.

MathFigure 3

$$MPR=CEIL\{M_A, 0.5\}$$ [Math.3]

Here, MA is as follows.

MA=8.2; 0≤A<0.025

9.2-40 A; 0.025≤A<0.05

8-16 A; 0.05≤A<0.25

4.83-3.33 A; 0.25≤A≤0.4, 3.83-0.83 A; 0.4≤A≤1,

As can be seen from FIG. 15(b), the base station may apply A-MPR (additional maximum power reduction) by transmitting a network signal (NS) to the terminal 100. The A-MPR, unlike the above-mentioned MPR, is that the base station transmits the network signal (NS) to the terminal 100 operating at a specific operating band so that the terminal 100 conducts additional power reduction in order not to affect adjacent bands, for example, not to give interference to the adjacent bands. That is, if a terminal applied with MPR receives a network signal (NS), A-MPR is additionally applied to determine transmission power.

The following table represents A-MPR values per network signal.

TABLE 10

| Network Signaling value | Channel bandwidth (MHz) | Resources Blocks (NRB) | A-MPR (dB) |
|---|---|---|---|
| NS_01 | 1.4, 3, 5, 10, 15, 20 | | Not defined |
| NS_03 | 3 | >5 | =1 |
| | 5 | >6 | =1 |
| | 10 | >6 | =1 |
| | 15 | >8 | =1 |
| | 20 | >10 | =1 |
| NS_04 | 5 | >6 | =1 |
| NS_05 | 10, 15, 20 | =50 | =1 |
| NS_06 | 1.4, 3, 5, 10 | — | Not defined |
| NS_07 | 10 | Shown in Table 9 | |
| NS_08 | 10, 15 | >44 | =3 |
| NS_09 | 10, 15 | >40 | =1 |
| | | >55 | =2 |
| NS_18 | 5 | =2 | =1 |
| | 10, 15, 20 | =1 | =4 |

The following table represents A-MPR values when the network signal is NS_07.
Table 11

TABLE 11

| Parameter | | Region A | Region B | Region C |
|---|---|---|---|---|
| RB$_{start}$ | | 0-12 | 13-18 19-42 | 43-49 |
| L$_{CRB}$ [RBs] | 6-8 | 1-5, 9-50 | =8 =18 | =2 |
| A-MPR [dB] | =8 | =12 | =12 =6 | =3 |

In the above table, RB$_{start}$ indicates the lowest RB index of a transmission RB. L$_{CRB}$ indicates the length of consecutive RB allocations.

For example, in case the terminal provided with a service using a 10 MHz channel bandwidth receives NS_07 as a network signal, the terminal determines transmission power according to the above table and transmits the determined transmission power. In other words, in case the terminal instructs 5 RBs to be continuously sent from the 10$^{th}$ RB that is a start point of the RBs when decoding a received uplink grant, the terminal may send the A-MPR value with up to 12 dB applied. Accordingly, the terminal s transmission power may apply alongside the equation for obtaining P$_{emax}$ below.

P$_{cmax}$ should satisfy the following conditions.

MathFigure4

$$P_{CMAX_L} = P_{CMAX} = P_{CMAX_H}$$ [Math.4]

Here, P$_{CMAX\_L}$ is obtained as follows.

MathFigure 5

$$P_{CMAX_H} = \text{MIN}\{P_{EMAX} - \Delta T_C, P_{PowerClass} - \text{MAX}(MPR + A\text{-}MPR, P\text{-}MPR) - \Delta TC\}$$ [Math.5]

P$_{CMAX\_L}$ is obtained as follows.

MathFigure 6

$$P_{CMAX_H} = \text{MIN}\{P_{EMAX}, P_{PowerClass}\}$$ [Math.6]

P$_{EMAX}$ is given as P-Max—through an RRC signal. P$_{PowerClass}$ represents the maximum UE power considering an allowable value. P-MPR is an allowable maximum power reduction. P-MPR may be obtained from the equation for yielding P$_{CMAX}$. T$_C$ may be 0 dB or 1.5 dB.

<A-MPR per CA>

On the other hands, taking CA into consideration, the channel bandwidth of uplink may be increased up to 40 MHz (20 MHz+20 MHz), and accordingly, a larger MPR value is needed. Thus, in case the base station transmits a network signal to the terminal to protect a specific band in the CA environment, additional power reduction is conducted in the terminal operating at the specific band, thereby protecting adjacent bands.

The following table represents CA configurations corresponding to network signals.

TABLE 12

| Network signal | CA configuration |
|---|---|
| CA_NS_01 | CA_1C |
| CA_NS_02 | CA_1C |
| CA_NS_03 | CA_1C |
| CA_NS_04 | CA_41C |
| CA_NS_05 | CA_38C |
| CA_NS_06 | CA_7C |

A-MPR for CS_NS_01 is summarized in detail in the following table.

TABLE 13

| Guard band | Frequency range (MHz) | Maximum level (dBm) | MBW (MHz) |
|---|---|---|---|
| E-UTRA band 34 | F$_{DL\_low}$-F$_{DL\_high}$ | −50 | 1 |
| Frequency range | 1884.5-1915.7 | −41 | 0.3 |

A-MPR for CS_NS_02 is summarized in detail in the following table.

TABLE 14

| Guard band | Frequency range (MHz) | Maximum level (dBm) | MBW (MHz) |
|---|---|---|---|
| E-UTRA band 34 | F$_{DL\_low}$-F$_{DL\_high}$ | −50 | 1 |
| Frequency range | 1900-1915 | −15.5 | 5 |
| Frequency range | 1915-1920 | +1.6 | 5 |

A-MPR for CS_NS_03 is summarized in detail in the following table.

TABLE 15

| Guard band | Frequency range (MHz) | Maximum level (dBm) | MBW (MHz) |
|---|---|---|---|
| E-UTRA band 34 | F$_{DL\_low}$-F$_{DL\_high}$ | −50 | 1 |
| Frequency range | 1880-1895 | −40 | 1 |
| Frequency range | 1895-1915 | −15.5 | 5 |
| Frequency range | 1915-1920 | +1.6 | 5 |

Figure 16:
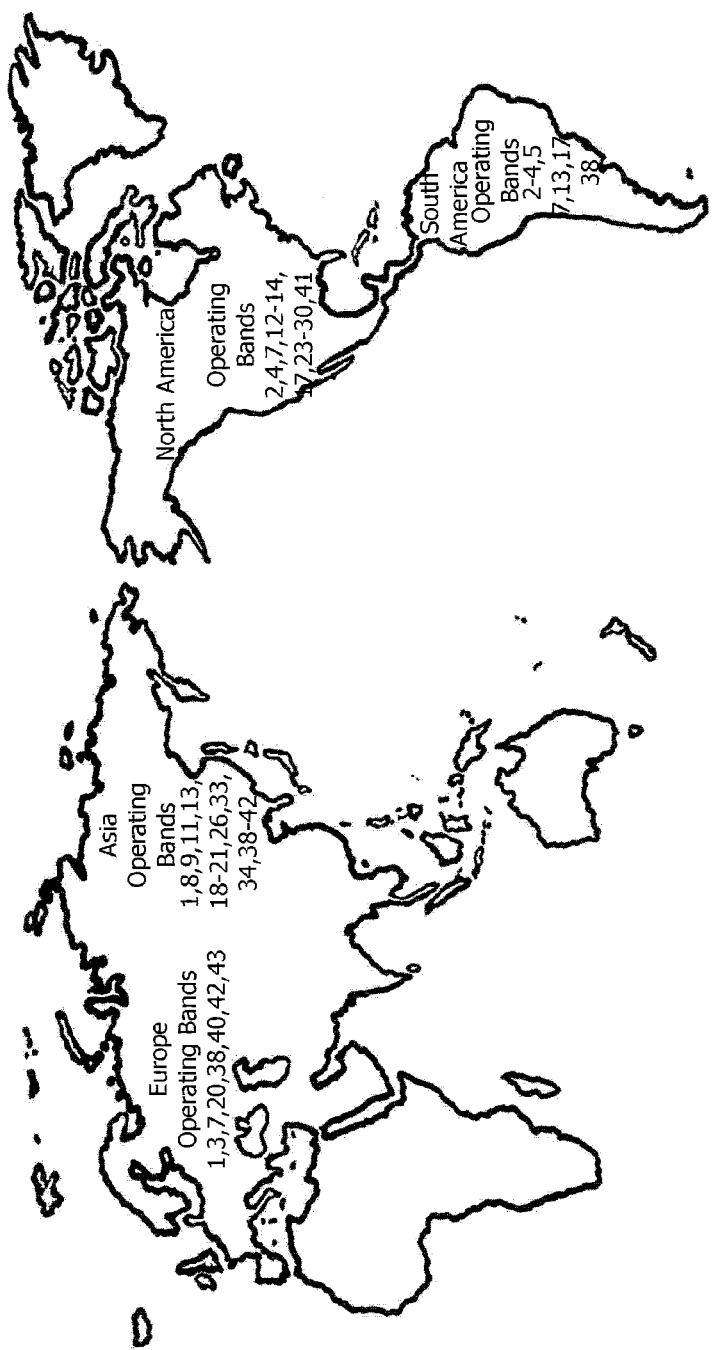
FIG. 16 illustrates a used example of operating bands by continents.

FIG. 16 illustrates a used example of operating bands by continents.

As described with reference to FIG. 16, bands 1, 3, 7, 20, 38, 40, 42, 43, and the like among the operating bands listed in the table 2 are used in Europe. Further, bands 1, 8, 9, 11, 13, 18 to 21, 26, 33, 34, 38 to 42, and the like among the operating bands listed in the table 2 are used in Asia. Bands 2, 4, 7, 12 to 14, 17, 23 to 30, 41, and the like are used in North America, and bands 2 to 4, 5, 7, 13, 17, 38, and the like are used in South America.

It is noticed in FIG. 16 that the band 1 is intended to be used in Asia or Europe but is not intended to be used in South America or North America according to 3GPP. Similarly, the band 5 is intended to be used in North America or South America but is not intended to be publicly used in Asia or Europe.

In this manner, according to the related art, a maximum level with respect to emission of a spurious region is simulated to meet bands used in respective continents. That is, only a maximum level with respect to a spurious emission between operating bands (for example, bands 1, 8, 9, 11, 13, 18 to 21, 26, 33, 34, and 38 to 42) for only Asia is simulated in Asia. Only a maximum level with respect to the spurious emission between operating bands (for example, bands 2 to 4, 7, 13, 17, and 38) for only South America is simulated in South America.

However, in recent years, a provider wishes to use a band (for example, band 5) which is not recommended and considered from 3GPP in some country (for example Korea) of Asia. Similarly, a provider wishes to use a band (for example, band 1) which is not previously considered in some country (for example Brazil) of South America. Accordingly, some country (for example Korea) uses the band 5, the spurious emission is leaked into other bands. Accordingly, interference occurs in the other bands. That is, a boundary of a use of a frequency by continents is broken so that there causes a spurious emission problem which is not previously considered.

Accordingly, in addition to existing classification between continents, there is a need to newly determine a maximum level with respect to the spurious emission. In particular, for a case where the band 1 and the band 5 are used due to carrier aggregation (CA), there is a demand to newly determine a maximum level with respect to the spurious emission.

<Brief Description of the Disclosure in the Specification>

A following table 16 illustrates a situation by some countries including recently added bands.

As understood through the above table, since bands used in Korea of Asia include most of bands operated in other countries, the spurious emission is simulated and an allowable maximum level is calculated using the bands used in Korea.

Further, in a case of Brazil, separately, the spurious emission is simulated and an allowable maximum level is calculated.

Figure 17A:
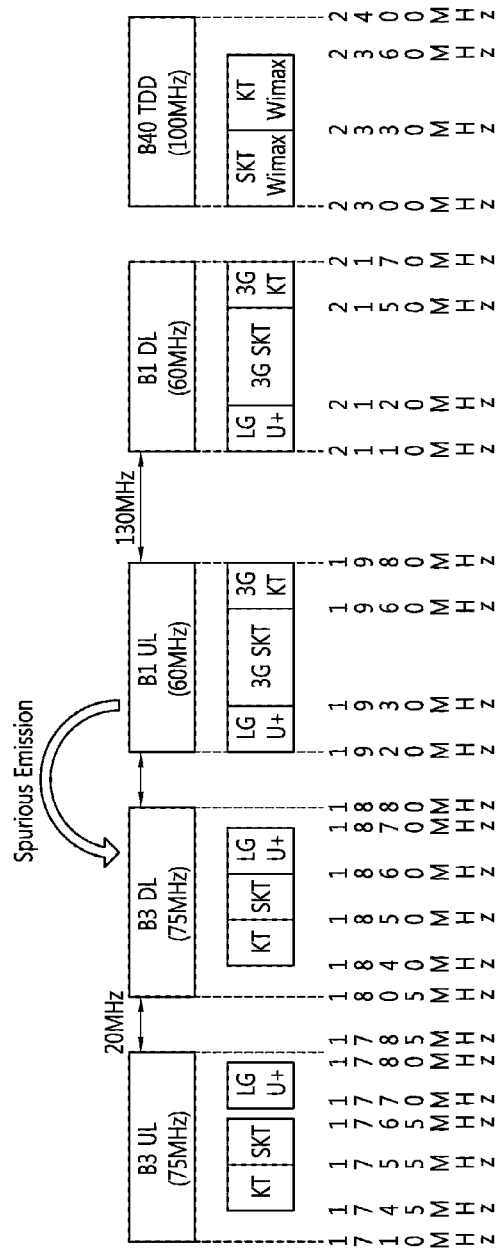
FIGS. 17A and 17B are exemplary diagrams illustrating bands used in Korea of Asia.
Figure 17B:
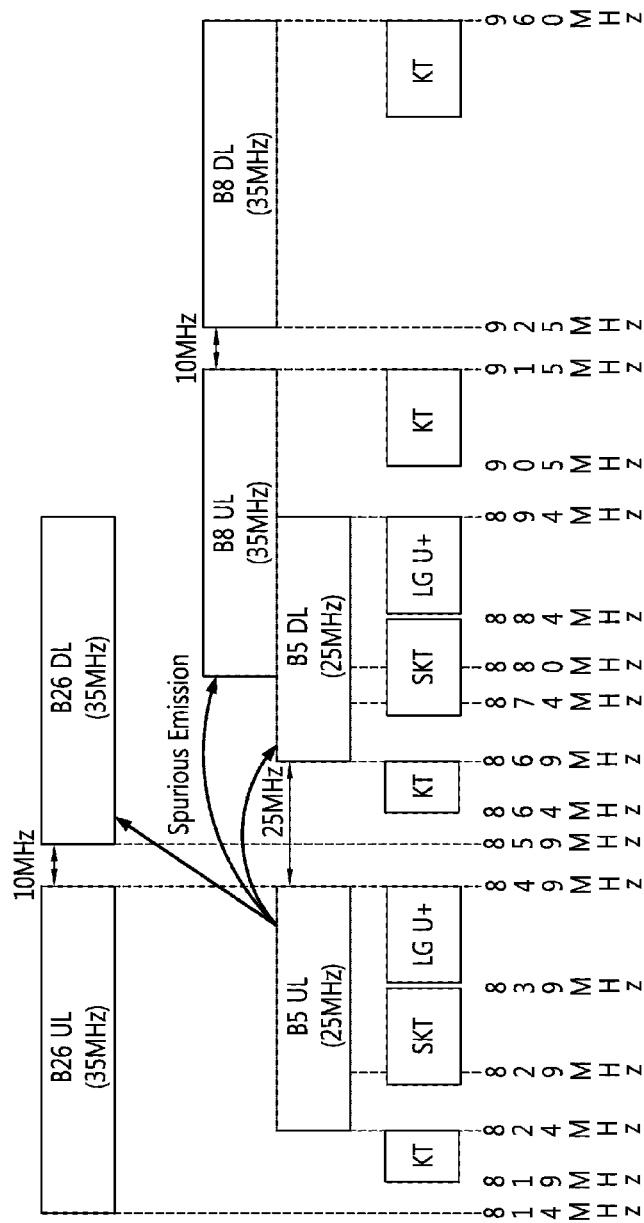

FIGS. 17A and 17B are exemplary diagrams illustrating bands used in Korea of Asia.

First, in Korea, a protected band includes bands 1, 3, 5, 8, 26, and 40.

As understood with reference to FIG. 17A, when subscriber UEs of providers LGU+, KT, and SKT in Korea use uplink UL of the band 1 which is not recommended from 3GPP with respect to Asia region, the spurious emission is leaked to an neighboring band 3.

Providers LGU+, KT, and SKT are using a neighboring band 3 in Korea.

Referring to FIG. 17B, when subscriber UEs of the providers LGU+, KT, and SKT in Korea use uplink UL of the band 5 which is not recommended from 3GPP with respect to Asia region, the spurious emission is leaked to uplink of a neighboring band 26, uplink of the hand 8, and downlink of the band 5. The provider KT is using a neighboring band 26 in Korea. Similarly, the provider KT is using the band 8 in Korea.

Figure 18A:
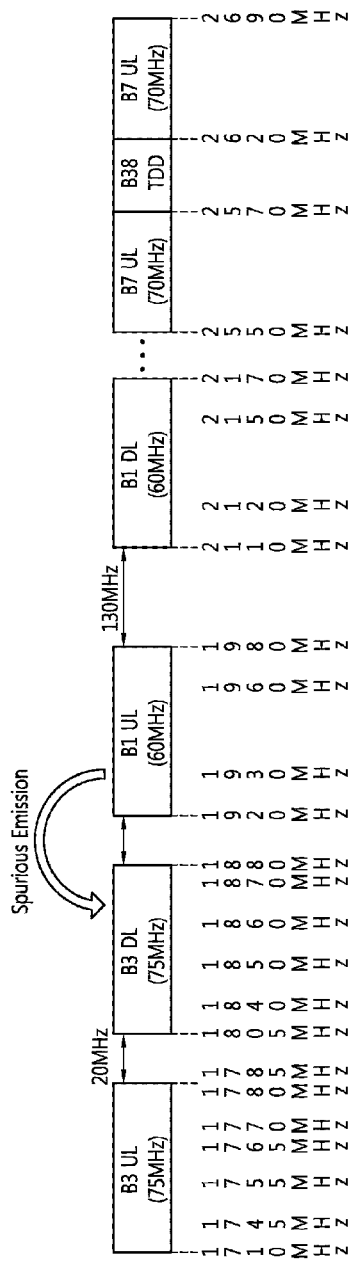
FIGS. 18A and 18B are exemplary diagrams illustrating bands used in Brazil of South America.
Figure 18B:
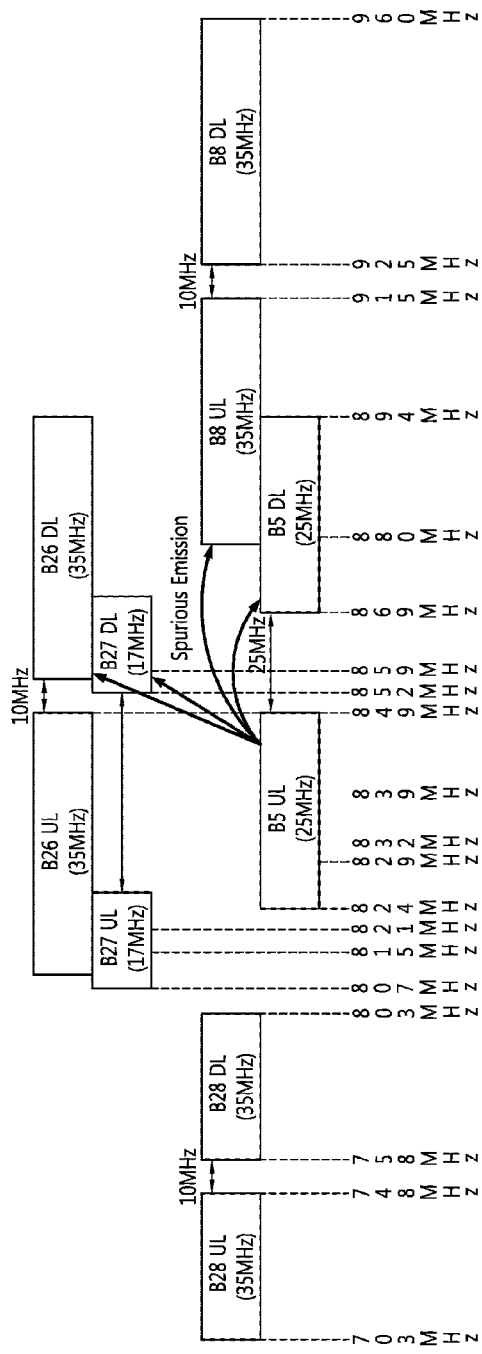

FIGS. 18A and 18B are exemplary diagrams illustrating bands used in Brazil of South America.

A protected band in Brazil includes bands 1, 3, 5, 7, 8, 26, 27, 28, 38, and 42.

As understood with reference to FIG. 18A, when uplink UP of band 1 which is not recommended from 3GPP is used with respect to South America region, the spurious emission is leaked to a neighboring band 3.

Referring to FIG. 18B, when uplink UP of band 5 which is not recommended from 3GPP is used with respect to the

TABLE 16

| | Operating band | | | | | | | | | | |
| --- | --- | --- | --- | --- | --- | --- | --- | --- | --- | --- | --- |
| | Band 1 2100 MHz | Band 3 1800 MHz | Band 5 850 MHz | Band 7 2600 MHz | Band 8 900 MHz | Band 26 850 MHz | Band 27 850 MHz | Band 28 700 MHz | Band 38 2600 MHz | Band 40 2300 MHz | Band 42 3500 MHz |
| Countries | X | X | X | X | X | X | | X | | X | |
| Korea | X | X | X | X | X | X | | X | | X | |
| Australia | X | X | X | | X | | X | X | | | |
| Brazil | X | X | X | X | X | X | X | X | X | | X |
| Costa Rica | X | X | X | | | | | | | | |
| Hong Kong | X | X | X | | X | | | | | | |
| Israel | X | X | X | | | | | | | | |
| New Zealand | X | X | X | | X | | | | | | |

South America region, the spurious emission is leaked to downlink of a neighboring band 27, downlink of a neighboring band 26, uplink of the hand 8, and downlink of the band 5.

Figure 19A:
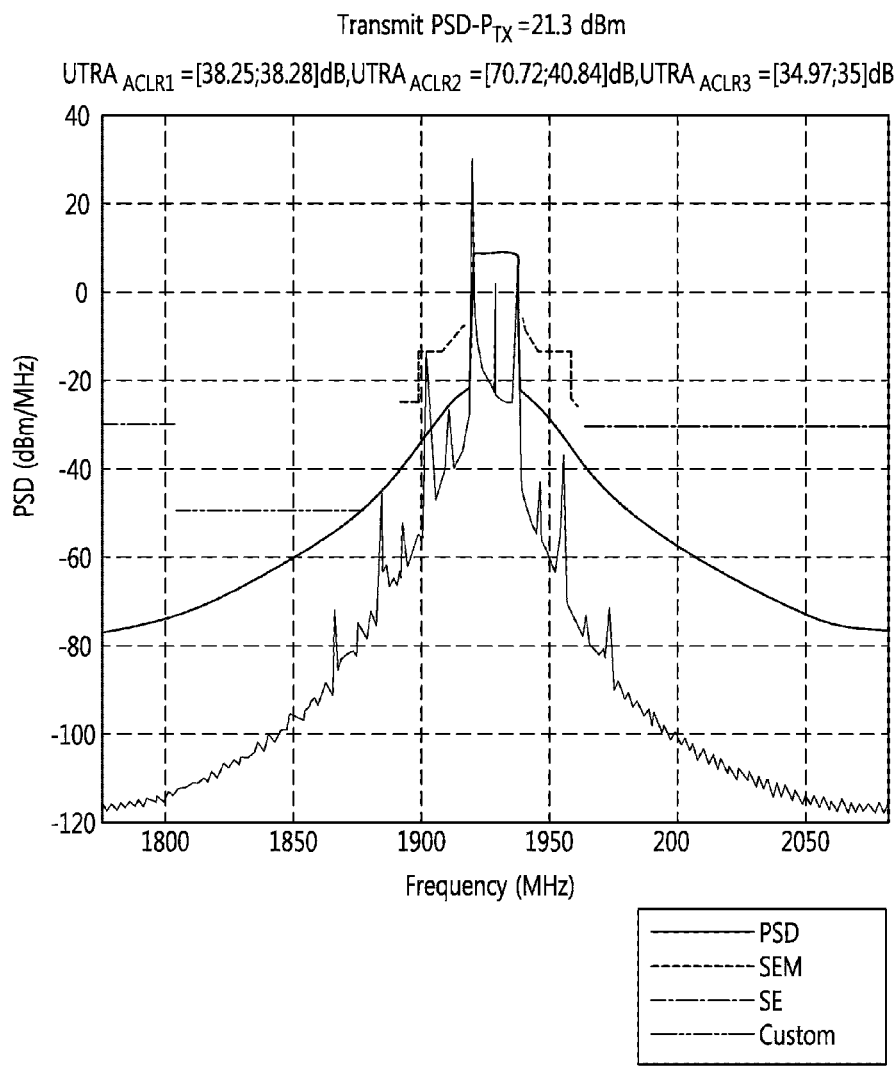
FIG. 19A is a graph illustrating an experimental result with respect to a band 1.
Figure 19B:
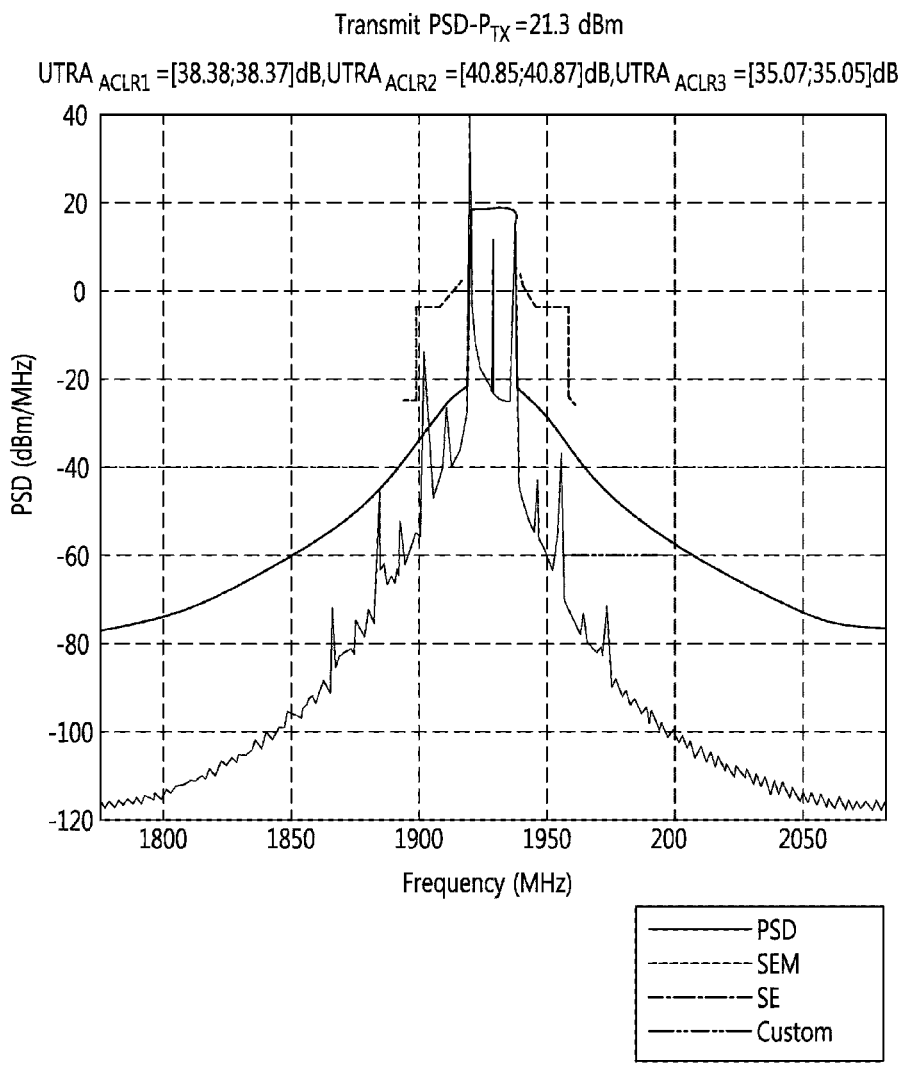
FIG. 19B is a graph illustrating an experimental result with respect to a band 5.

FIG. 19A is a graph illustrating an experimental result with respect to a band 1, and FIG. 19B is a graph illustrating an experimental result with respect to a band 5.

Basic RF simulation assumption and parameters will be described as follows.

Transmission and reception architecture: LTE/LTE-A based UE

Channel bandwidth (PCC+SCC): 10 MHz, 15 MHz, 20 MHz

Modulator impairments are as follows.

I/Q imbalance: 25 dBc

Carrier leakage: 25 dBc

Counter IM3: 60 dBc

In this case I/Q imbalance operates as diffusion between symmetrical sub-carriers to degrade performance. In this case, the unit dBc represents a relative size based on power of a carrier frequency. Carrier leakage is an additional sine wave having the same frequency as a carrier frequency of a modulation wave.

Counter IM3 (Counter Intermodulation Distortion) represents an element generated by a component such as a mixer and an amplifier in an RF system.

PA (Power Amplifier) operating point: Pout=22 dBm (when QPSK is used and the whole 100 RB is assigned)

Noise Floor: −140 dBm/Hz in PA output

Insertion loss: 3 dB

Measurement band: dBm/1 MHz

As understood with reference to FIG. 19A, when the UE performs a transmission in uplink of the band 1, a maximum level of spurious emission SE to downlink 1805 to 1880 MHz of a neighboring band 3 is about −48 dBm/MHz.

As understood with reference to FIG. 19B, when the UE performs a transmission in uplink of the band 5, a maximum level of spurious emission SE to downlink of band 5 is about −35 dBm/MHz. In addition to the experimental result, if it is considered that attenuation of a duplexer is about 20 dB, it may be calculated that a maximum level of a leaked spurious emission SE is −35−20=−55 dBm/MHz.

Further, a current emission regulation value for protecting basic UE-to-UE uses −50 dBm. Deterministic analysis with respect to this is a value calculated by a following assumption, and is used as general UE-to-UE coexistence requirements in 3GPP.

i) Duplexer attenuation consideration: reuse of duplexer attenuation at band 1 and band 5 for attacker UE to derive a reference sensitivity (REFSENS) level with respect to victim UE (that is, UE using neighboring bands such as bands 1, 3, 5, 7, 8, 26, 27, 38, and 40).

ii) Antenna and human body loss: maximum 8 dB per person iii) Maximum transmission power: consider MPR and A-MPR at the band 1 and band 5 iv) Channel model: free space path loss model v) UE to UE separate distance: 1 m or less vi) Density less than 3 dB at a static condition A spurious emission level of UE-to-UE using minimum coupling loss (MCL) may be derived from the above assumption.

Spurious emission SE required in transmission=noise increase allowed in reception+MCL+penetration loss In this case, the noise increase allowed in the reception is an interference level estimated as follows.

Allowable noise increase=−174 dB/Hz+60 dB/Hz+9 dB(NF)=−105 dBm/1 MHz

Further, the MCL level is derived as follows.

MCL=path loss+transmission/reception antenna gain=38.44+8 dB*2 users=54.44

In this case, the path loss=20*log 10(fc[MHz])+20 log 10(d[m])−27.6=38.44 dB. Further, it is assumed that the penetration less is ODB between neighboring UEs.

By using the deterministic analysis, the emission level is calculated as −50.56 dBm/1 MHz.

As a result, it may be determined that a maximum level of the spurious emission SE required for UE-to-UE coexistence may be determined as approximately −50 dBm/MHz.

Accordingly, referring to FIGS. 17A and 17B, a UE-to-UE coexistence problem in Asia, that is, in Korea is as follows.

1) Uplink of Band 1 (1920 to 1980 MHz)

Downlink of band 3 (1805 to 1880 MHz): has a gap of 40 MHz from the band 1. Accordingly, a maximum level of the spurious emission may be the range of −40 to −50 dBm/MHz.

Band 40 (2300 to 2400 MHz): has a gap of 320 MHz from band 1. Accordingly, a maximum level of the spurious emission may be −50 dBm/MHz.

Other bands 1, 5, 8, and 26: Since there is no harmonic component or intermodulation distortion (IMD), a general UE-to-UE coexistence problem may be solved. Accordingly, the maximum level of the spurious emission may be −50 dBm/MHz.

2) Uplink of Band 5 (824 to 849 MHz):

Downlink of band 26 (859 to 894 MHz): has a gap of 10 MHz from the band 5. Accordingly, the maximum level of the spurious emission may be −27 dBm/MHz.

Downlink of band 8 (925 to 960 MHz): has a gap of 76 MHz from the band 5. Accordingly, the maximum level of the spurious emission may be −50 dBm/MHz.

Other bands 1, 3, 5, and 40: Since there is no harmonic component or intermodulation distortion (IMD), a general UE-to-UE coexistence problem may be solved. Accordingly, the maximum level of the spurious emission may be calculated as −50 dBm/MHz.

Meanwhile, referring to FIGS. 18A and 18B, a UE-to-UE coexistence problem in South America, that is, in Brazil is as follows.

1) Uplink of Band 1 (1920 to 1980 MHz)

Downlink of band 3 (1805 to 1880 MHz): has a gap of 40 MHz from the band 1. Accordingly, the maximum level of the spurious emission may be calculated as the range of −40 to −50 dBm/MHz.

Band 40 (2300 to 2400 MHz): has a gap of 320 MHz from the band 1. Accordingly, the maximum level of the spurious emission may be calculated as −50 dBm/MHz.

Other band 38 (2570 to 2620 MHz), downlink of band 7 (2620 to 2690 MHz), and band 43 (3600 to 3800 MHz): Since there is no harmonic component or intermodulation distortion (IMD), a general UE-to-UE coexistence problem may be solved. Accordingly, the maximum level of the spurious emission may be calculated as −50 dBm/MHz.

Other bands 1, 5, 8, 26, 27, and 28: Since there is no harmonic component or intermodulation distortion (IMD), a general UE-to-UE coexistence problem may be solved. Accordingly, the maximum level of the spurious emission may be calculated as −50 dBm/MHz.

Downlink of band 28 (758 to 803 MHz): has a gap of 21 MHz from the band 5. Accordingly, the maximum level of the spurious emission may be calculated as −37 dBm/MHz.

Other bands 1, 3, 5, 7, 38, and 43: Since there is no harmonic component or intermodulation distortion (IMD), a general UE-to-UE coexistence problem may be solved. Accordingly, the maximum level of the spurious emission may be calculated as −50 dBm/MHz.

As described above, a maximum level with respect to the spurious emission for a case of using the band 1 and the band 5 for carrier aggregation CA is listed in the table 16.

Table 16 illustrates UE-to-UE coexistence with respect to a protected band in Korea, Brazil, and Australia. Accordingly, a first scheme to set UE-to-UE coexistence requirements according to the embodiment is a scheme to set spurious requirements with respect to protected bands 1,3,5,7,8,26,27, 28,38,40, and 42 in Asia-pacific region and South America region in which an UE using CA 1A-5A (carrier aggregation of bandwidth class A($N_{RB,agg}$=100 at band 1) and bandwidth class A($N_{RB,agg}$=100) at the band 5).

TABLE 17

| E-UTRA CA configuration | Protected bands | Spurious emission | | | Remarks |
| --- | --- | --- | --- | --- | --- |
| | | Frequency range (MHz) | Maximum level (dBm) | MBW (MHz) | |
| CA_1A-5A | E-UTRA bands 1, 3, 5, 7, 8, 38, 40, 42 | $F_{DL\_low}$-$F_{DL\_high}$ | −50 | 1 | |
| | E-UTRA band 26 | $F_{DL\_low}$-$F_{DL\_high}$ | −27 | 1 | |
| | E-UTRA band 28 | $F_{DL\_low}$-$F_{DL\_high}$ | −37 | 1 | |

Remark 1: The measurements are applied to a region in which systems for CA 1A-5A UE are disposed.
Remark 2: An FDL_low and an FDL_high represent a frequency listed in table 2.
Remark 3: CA 1A-5A UE does not need to protect band 27 beyond SEM limitation.

2) Uplink of Band 5 (824 to 849 MHz):

Downlink of band 26 (859 to 894 MHz): has a gap of 10 MHz from the band 5. Accordingly, the maximum level of the spurious emission may be calculated as −27 dBm/MHz.

Downlink of band 26 (859 to 894 MHz): has a gap of 10 MHz from the band 5. Accordingly, the maximum level of the spurious emission may be calculated as −27 dBm/MHz.

Downlink of band 8 (925 to 960 MHz): has a gap of 76 MHz from the band 5. Accordingly, the maximum level of the spurious emission may be calculated as −50 dBm/MHz.

Downlink of band 27 (852 to 869 MHz): has a gap of 3 MHz from the band 5. Accordingly, the maximum level of the spurious emission may be calculated as 1.6 dBm/5 MHz with respect to 849 to 854 MHz. The maximum level of the spurious emission may be calculated as −15.5 dBm/5 MHz with respect to 854 to 869 MHz.

Referring to the remark 3 in the table 17, since the band 27 is spaced apart from the band 5 by 3 MHz, among transmission requirements, requirements with respect to SEM which is satisfied to be more difficult than UE-to-UE coexistence requirements may be satisfied. In the related art, requirements of −10 dBm/MHz are established with respect to a protected band spaced apart from an attack band by 3 MHz. However, the UE-to-UE coexistence requirements are automatically satisfied if SEM for one carrier wave is satisfied.

A second scheme to set UE-to-UE coexistence requirements according to the present invention sets UE-to-UE coexistence requirements by regions or countries. In this case, the spurious emission SE requirements should be set by countries such as Korea and Brazil or by regions (or continents). In this case, interference issue occurs at other region and other country upon roaming so that CA 1A-5A cannot be used. Only when a UE using band 1 of 3GPP release 8 and 9 or band 5 is used, the interference may be prevented. However, when two uplink inter-band CAs are performed, the second scheme may be one solution.

This is expressed by a following table 18.

TABLE 18

| E-UTRA CA configuration | Protected bands | Spurious emission | | | Remarks |
|---|---|---|---|---|---|
| | | Frequency range (MHz) | Maximum level (dBm) | MBW (MHz) | |
| CA_1A-5A Asia | E-UTRA bands 1, 3, 5, 8, 40 | $F_{DL\_low}$-$F_{DL\_high}$ | −50 | 1 | |
| | E-UTRA band 26 | $F_{DL\_low}$-$F_{DL\_high}$ | −27 | 1 | |
| CA_1A-5A South America | E-UTRA Band 1, 3, 5, 7, 8, 38, 43 | $F_{DL\_low}$-$F_{DL\_high}$ | −50 | 1 | |
| | E-UTRA band 26 | $F_{DL\_low}$-$F_{DL\_high}$ | −27 | 1 | |
| | E-UTRA band 28 | $F_{DL\_low}$-$F_{DL\_high}$ | −37 | 1 | |

Remark 1: The measurements are applied to a region in which systems for CA 1A-5A UE are disposed.
Remark 2: An FDL_low and an FDL_high represent a frequency listed in table 2.
Remark 3: CA 1A-5A UE does not need to protect band 27 beyond SEM limitation.

A third scheme to set UE-to-UE coexistence requirements according to the present invention sets UE-to-UE coexistence requirements with respect to all bands defined as protected bands for an existing band and all protected bands of the band 5. This may solve all interference issues between neighboring UEs upon global roaming and allows inter-band CA 1A-5A to be used in all regions. Accordingly, the third scheme sets requirements with respect to E-UTRA bands 1, 3, 7, 8, 9, 11, 18, 19, 20, 21, 22, 26, 27, 28, 33, 34, 38, 39, 40, 42, 43, and 44 serving as a protected band of band 1 and a PHS band, and sets requirements with respect to E-UTRA bands 2, 4, 5, 10, 12, 13, 14, 17, 22, 23, 24, 25, 26, 27, 28, 41, 42, and 43 serving as a protected band of band 5.

However, the third scheme cannot be used in countries and regions in which operating band partially overlapped or perfectly subset between actual operating bands are used. For example, since downlink of the band 2 is 1930-1990 MHz, the downlink of the band 2 overlaps with downlink of the band 1 during a period of 1930 to 1980 MHz. In this case, the downlink of the band 2 cannot be discriminated by a duplexer or a filter. Accordingly, a UE of the band 1 significantly interferes with an UE of a neighboring band 2. Accordingly, the band 2 or the band 25 and the band 25 cannot be used in the same region.

TABLE 19

| E-UTRA CA configuration | Protected bands | Spurious emission | | | Remarks |
|---|---|---|---|---|---|
| | | Frequency range | Maximum level (dBm) | MBW (MHz) | |
| CA_1A-5A | E-UTRA bands 1, 4, 5, 7, 8, 10, 11, 12, 13, 14, 17, 19, 21, 22, 23, 24, 38, 40, 42, and 43 | $F_{DL\_low}$-$F_{DL\_high}$ | −50 | 1 | |
| | E-UTRA bands 3 and 34 | $F_{DL\_low}$-$F_{DL\_high}$ | −50 | 1 | 6 |
| | E-UTRA band 26 | $F_{DL\_low}$-$F_{DL\_high}$ | −27 | 1 | |
| | E-UTRA band 28 | $F_{DL\_low}$-$F_{DL\_high}$ | −37 | 1 | |
| | E-UTRA band 41 | $F_{DL\_low}$-$F_{DL\_high}$ | −50 | 1 | 5 |
| | E-UTRA band 18 | $F_{DL\_low}$-$F_{DL\_high}$ | −27 | 1 | |
| | E-UTRA band 44 | $F_{DL\_low}$-$F_{DL\_high}$ | −37 | 1 | |
| | Frequency range (band 39) | 1880 1895 | −40 | 1 | 6, 27 |
| | Frequency range (bands 33, 39) | 1895 1915 | −15.5 | 5 | 6, 27 |
| | Frequency range (bands 33 and 39) | 1915 1920 | +1.6 | 5 | 6, 27 |
| | Frequency range (PHS) | 1884.5-1915.7 | −41 | 0.3 | 7, 8, 6 |
| | Frequency range (band 9) | 1839.9-1879.9 | −50 | 1 | 6 |

Remark 1: The measurements are applied to a region in which systems for CA 1A-5A UE are disposed.
Remark 2: An FDL_low and an FDL_high represent a frequency listed in table 2.
Remark 3: CA 1A-5A UE does not need to protect band 27 beyond SEM limitation.
Remark 4: Since band 2 and band 25 may be served in the same region, the requirements are not applied.
Remark 7: It is applied when a NS_05 signal is received from a network.
Remark 8: It is applied to coexistence with a PHS system operating at 1884.5-1915.7 MHz.

Meanwhile, in order to combine the above CA bands by regions (or continents), in addition to schemes to add UE-to-UE coexistence requirements supporting two uplink inter-band CAs, requirements by regions (continents) with two uplinks may be added to UE-to-UE coexistence requires of existing 3GPP release 8 or 9. This may be presented as a union of lists having bands to be protected in a region in which two inter-bands are used as in the above suggested scheme. In a case of the above inter-band CA 1A-5A UE and 3A-5A, bands to be protected in Asia include bands 1, 3, 5, 8, 26, and 40. Protected bands in South America region include bands 1, 3, 5, 7, 8, 26, 27, 28, 38, and 42. Accordingly, a union thereof may add requirements with respect to protected bands 1, 3, 5, 7, 8, 26, 27, 28, 38, 40, and 42 in Asia-pacific region and South America region as follows.

TABLE 20

| E-UTRA band | Protected Bands | Spurious emission Frequency range (MHz) | Maximum level (dBm) | MBW (MHz) | Remarks |
|---|---|---|---|---|---|
| 1 | E-UTRA Bands 1, 7, 8, 11, 18, 19, 20, 21, 22, 26, 27, 28, 31, 38, 40, 41, 42, 43, 44 | $F_{DL\_low}$-$F_{DL\_high}$ | −50 | 1 | |
| | E-UTRA Bands 5 | $F_{DL\_low}$-$F_{DL\_high}$ | −50 | 1 | 32 |
| | E-UTRA Bands 3, 34 | $F_{DL\_low}$-$F_{DL\_high}$ | −50 | 1 | 15 |
| | Frequency Range | 1880 1895 | −40 | 1 | 15, 27 |
| | Frequency Range | 1895 1915 | −15.5 | 5 | 15, 26, 27 |
| | Frequency Range | 1915 1920 | +1.6 | 5 | 15, 26, 27 |
| | Frequency Range | 1884.5-1915.7 | −41 | 0.3 | 6, 8, 15 |
| | Frequency Range | 1839.9-1879.9 | −50 | 1 | 15 |
| 2 | E-UTRA Bands 4, 5, 10, 12, 13, 14, 17, 22, 23, 24, 26, 27, 28, 29, 30, 41, 42 | $F_{DL\_low}$-$F_{DL\_high}$ | −50 | 1 | |
| | E-UTRA Bands 2, 25 | $F_{DL\_low}$-$F_{DL\_high}$ | −50 | 1 | 15 |
| | E-UTRA Bands 43 | $F_{DL\_low}$-$F_{DL\_high}$ | −50 | 1 | 2 |
| 3 | E-UTRA Bands 1, 7, 8, 20, 26, 27, 28, 31, 33, 34, 38, 41, 43, 44 | $F_{DL\_low}$-$F_{DL\_high}$ | −50 | 1 | |
| | E-UTRA Bands 5 | $F_{DL\_low}$-$F_{DL\_high}$ | −50 | 1 | 32 |
| | E-UTRA Bands 3 | $F_{DL\_low}$-$F_{DL\_high}$ | −50 | 1 | 15 |
| | E-UTRA Bands 11, 18, 19, 21 | $F_{DL\_low}$-$F_{DL\_high}$ | −50 | 1 | 13 |
| | E-UTRA Bands 22, 42 | $F_{DL\_low}$-$F_{DL\_high}$ | −50 | 1 | 2 |
| | Frequency Range | 1884.5-1915.7 | −41 | 0.3 | 13 |
| 4 | E-UTRA Bands 2, 4, 5, 10, 12, 13, 14, 17, 22, 23, 24, 25, 26, 27, 28, 29, 30, 41, 43 | $F_{DL\_low}$-$F_{DL\_high}$ | −50 | 1 | |
| | E-UTRA Bands 7 | $F_{DL\_low}$-$F_{DL\_high}$ | −50 | 1 | 32 |
| | E-UTRA Bands 42 | $F_{DL\_low}$-$F_{DL\_high}$ | −50 | 1 | 2 |
| 5 | E-UTRA Bands 2, 4, 5, 10, 12, 13, 14, 17, 22, 23, 24, 25, 28, 29, 30, 31, 42, 43 | $F_{DL\_low}$-$F_{DL\_high}$ | −50 | 1 | |
| | E-UTRA Bands 1, 3, 7, 8, 38, 40 | $F_{DL\_low}$-$F_{DL\_high}$ | −50 | 1 | 32 |
| | E-UTRA Bands 41 | $F_{DL\_low}$-$F_{DL\_high}$ | −50 | 1 | 2 |
| | E-UTRA Bands 26 | 859-869 | −27 | 1 | |
| 6 | E-UTRA Bands 1, 9, 11, 34 | $F_{DL\_low}$-$F_{DL\_high}$ | −50 | 1 | |
| | Frequency Range | 860-875 | −37 | 1 | |
| | Frequency Range | 875-895 | −50 | 1 | |
| | Frequency Range | 1884.5-1919.6 | −41 | 0.3 | 7 |
| | | 1884.5-1915.7 | | | 8 |
| 7 | E-UTRA Bands 1, 3, 7, 8, 20, 22, 27, 28, 29, 30, 31, 33, 34, 42, 43 | $F_{DL\_low}$-$F_{DL\_high}$ | −50 | 1 | |
| | E-UTRA Bands 4 | $F_{DL\_low}$-$F_{DL\_high}$ | −50 | 1 | 32 |
| | Frequency Range | 2570-2575 | +1.6 | 5 | 15, 21, 26 |
| | Frequency Range | 2575-2595 | −15.5 | 5 | 15, 21, 26 |
| | Frequency Range | 2595-2620 | −40 | 1 | 15, 21 |

NOTE 32:
it is applied when a UE supports two uplink inter-band CAs.

Figure 20:
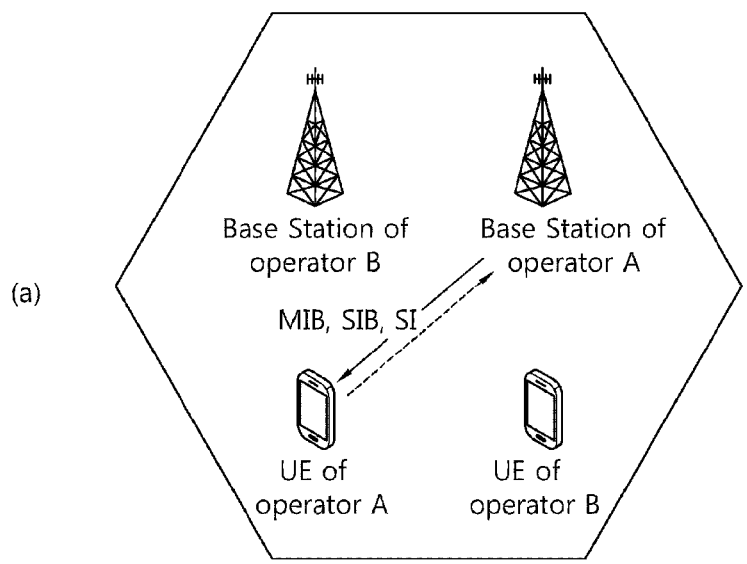
FIG. 20 illustrates an operation of UE according to the present invention.
Figure 20:
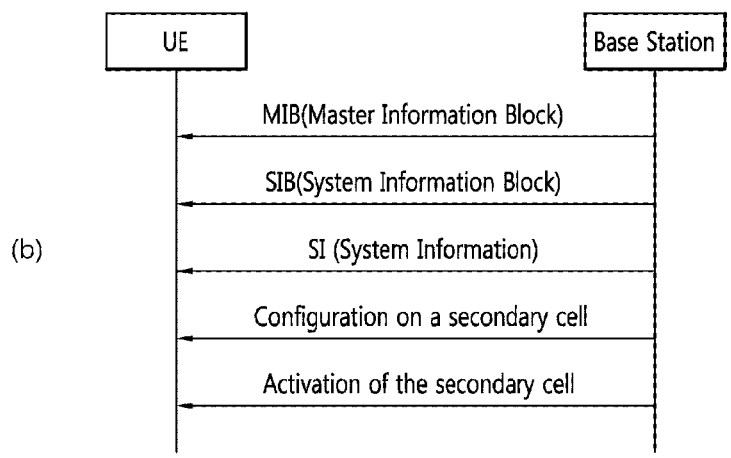

FIG. 20 illustrates an operation of UE according to the present invention.

Referring to FIG. 20(a) FIG. 20(a) illustrates an example where a provider A and a provider B simultaneously provide a service to a specific region.

In this situation, as shown in FIG. 20(b), a BS of the provider A transmits a Master Information Block (MIB) and a System Information Block (SIB).

The SIB may include at least one of information on operating bands used by the BS, information on a uplink UL bandwidth, and information on a uplink UL carrier frequency among operating bands listed in the table 2.

In this case, when carrier aggregation CA is set and the CA is activated, a UE of a provider A determines whether the set CA corresponds to inter-band CA. The CA may be set by receiving setting of a secondary cell. Further, the CA may be activated by receiving a signal on activation of a secondary cell.

When the set CA corresponds to inter-band CA, each carrier wave has the band 1 and the band 5, and the number of resource blocks RBs of each band is 100 or less, the UE of a provider A transmits a maximum level of spurious emission less than a value listed in one of the tables 16 to 19 leaked as a protected band listed in one of tables 16 to 19.

However, when a band to be used by the UE is one of the band 1 and the band 5 based on the SIB, the UE of the provider A transmits a maximum value of spurious emission leaked to a protected band listed in table 19 less than a value listed in the table 19.

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 21.

Figure 21:
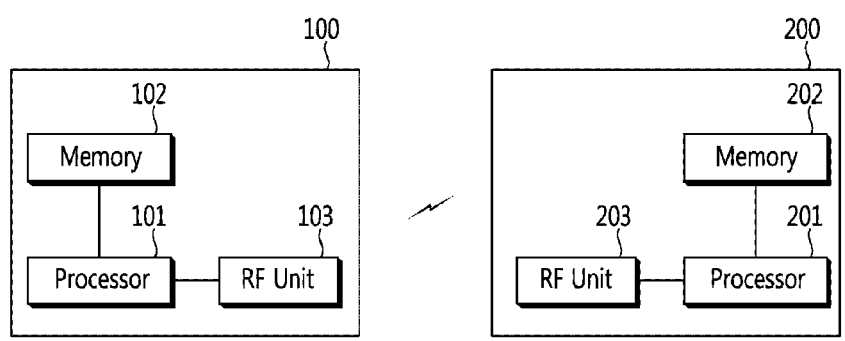
FIG. 21 is a block diagram illustrating a wireless communication system according to an embodiment of the present invention.

FIG. 21 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/or receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/or receive a wireless signal. The processor 101 implements a suggested function, procedure, and/or method. An operation of the wireless 100 according to the above embodiment may be implemented by the processor 201.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

The invention claimed is:

1. A method for limiting a spurious emission, the method performed by a user equipment (UE) and comprising:
if a radio frequency (RF) unit of the UE is configured to use a band 1, configuring the RF unit of the UE to limit a maximum level of spurious emission to −50 dBm for protecting other UE using a band 5 to apply a UE-to-UE coexistence requirement for a same region to inter-regions;
if the RF unit of the UE is configured to use the band 5, configuring the RF unit of the UE to limit the maximum level of spurious emission to −50 dBm for protecting the other UE using at least one of bands 1, 3, 7, 8, 38, 40 to apply the UE-to-UE coexistence requirement for the same region to inter-regions; and
transmitting an uplink signal through the configured RF unit,
wherein the band 1 includes an uplink operating band of 1920-1980 MHz and a downlink operating band of 2110-2170 MHz,
wherein the band 3 includes an uplink operating band of 1710-1785 MHz and a downlink operating band of 1805-1880 MHz,
wherein the band 5 includes an uplink operating band of 824-849 MHz and a downlink operating band of 869-894 MHz,
wherein the band 7 includes an uplink operating band of 2500-2570 MHz and a downlink operating band of 2620-2690 MHz,
wherein the band 8 includes an uplink operating band of 880-915 MHz and a downlink operating band of 925-960 MHz,
wherein the band 38 includes an uplink operating band of 2570-2620 MHz and a downlink operating band of 2570-2620 MHz, and
wherein the band 40 includes an uplink operating band of 2300-2400 MHz and a downlink operating band of 2300-2400 MHz.

2. The method of claim 1, wherein when the RF unit aggregates inter-band carriers of the band 1 and the band 5, the RF unit is configured to limit the maximum level of the spurious emission to −50 dBm.

3. The method of claim 1, further comprising receiving setting carrier aggregation of the bands 1 and 5.

4. The method of claim 1, further comprising receiving system information, wherein the system information comprises information on at least one of the bands 1 and 5.

5. A wireless apparatus for transmitting an uplink signal, the wireless apparatus comprising:
a processor; and
a radio frequency (RF) unit controllable by the processor and configured to transmit the uplink signal,
wherein if the RF unit is configured to use a band 1, a maximum level of spurious emission is limited to −50 dBm for protecting other UE using a band 5 to apply a UE-to-UE coexistence requirement for a same region to inter-regions,
wherein if the RF unit is configured to use the band 5, the maximum level of spurious emission is limited to −50 dBm for protecting the other UE using at least one of bands 1, 3, 7, 8, 38, 40 to apply the UE-to-UE coexistence requirement for the same region to inter-regions,
wherein the band 1 includes an uplink operating band of 1920-1980 MHz and a downlink operating band of 2110-2170 MHz,
wherein the band 3 includes an uplink operating band of 1710-1785 MHz and a downlink operating band of 1805-1880 MHz,
wherein the band 5 includes an uplink operating band of 824-849 MHz and a downlink operating band of 869-894 MHz, wherein the band 7 includes an uplink operating band of 2500-2570 MHz and a downlink operating band of 2620-2690 MHz, wherein the band 8 includes an uplink operating band of 880-915 MHz and a downlink operating band of 925-960 MHz, wherein the band 38 includes an uplink operating band of 2570-2620 MHz and a downlink operating band of 2570-2620 MHz, and wherein the band 40 includes an uplink operating band of 2300-2400 MHz and a downlink operating band of 2300-2400 MHz.

6. The wireless apparatus of claim 5, wherein when the RF unit aggregates inter-band carriers of the band 1 and the band 5, the RF unit is configured to limit the maximum level of the spurious emission to −50 dBm.

7. The wireless apparatus of claim 5, wherein the RF unit receives setting carrier aggregation of the bands 1 and 5.

8. The wireless apparatus of claim 5, wherein the RF unit receives system information, and the system information comprises information on at least one of the bands 1 and 5.

9. A method for limiting a spurious emission, the method performed by a user equipment (UE) and comprising:

receiving a configuration on carrier aggregation of bands 1 and 5;

if a number of resource blocks (RBs) in each of the bands 1 and 5 are equal to or less than 100, configuring a radio frequency (RF) unit of the UE to limit a maximum level of spurious emission to −50 dBm to protect other UE using at least one of bands 1, 3, 5, 7, 8, 38, 40, 42 to apply a UE-to-UE coexistence requirement for a same region to inter-regions; and transmitting an uplink signal through the configured RF unit, wherein the band 1 includes an uplink operating band of 1920-1980 MHz and a downlink operating band of 2110-2170 MHz, wherein the band 3 includes an uplink operating band of 1710-1785 MHz and a downlink operating band of 1805-1880 MHz, wherein the band 5 includes an uplink operating band of 824-849 MHz and a downlink operating band of 869-894 MHz, wherein the band 7 includes an uplink operating band of 2500-2570 MHz and a downlink operating band of 2620-2690 MHz, wherein the band 8 includes an uplink operating band of 880-915 MHz and a downlink operating band of 925-960 MHz, wherein the band 38 includes an uplink operating band of 2570-2620 MHz and a downlink operating band of 2570-2620 MHz, and wherein the band 40 includes an uplink operating band of 2300-2400 MHz and a downlink operating band of 2300-2400 MHz, and wherein the band 42 includes an uplink operating band of 3400-3600 MHz and a downlink operating band of 3400-3600 MHz.

10. The method of claim 9, further comprising configuring the RF unit of the UE to limit the maximum level of the spurious emission to −27 dBm for protecting a band 26 including an uplink operating band of 814-849 MHz and a downlink operating band of 859-894 MHz.

11. The method of claim 9, further comprising configuring the RF unit of the UE to limit the maximum level of the spurious emission to −37 dBm for protecting a band 28 including an uplink operating band of 703-748 MHz and a downlink operating band of 758-803 MHz.

12. The method of claim 9, further comprising receiving system information, wherein the system information comprises information on at least one of the bands 1 and 5.

13. A wireless apparatus for transmitting an uplink signal, the wireless apparatus comprising:

a processor; and a radio frequency (RF) unit controllable by the processor and configured to transmit the uplink signal, wherein if the RF unit is configured to aggregate bands 1 and 5, and if a number of resource blocks (RBs) in each of the bands 1 and 5 are equal to or less than 100, a maximum level of spurious emission is limited to −50 dBm to protect other UE using at least one of bands 1, 3, 5, 7, 8, 38, 40, 42 to apply a UE-to-UE coexistence requirement for a same region to inter-regions, wherein the band 1 includes an uplink operating band of 1920-1980 MHz and a downlink operating band of 2110-2170 MHz, wherein the band 3 includes an uplink operating band of 1710-1785 MHz and a downlink operating band of 1805-1880 MHz, wherein the band 5 includes an uplink operating band of 824-849 MHz and a downlink operating band of 869-894 MHz, wherein the band 7 includes an uplink operating band of 2500-2570 MHz and a downlink operating band of 2620-2690 MHz, wherein the band 8 includes an uplink operating band of 880-915 MHz and a downlink operating band of 925-960 MHz, wherein the band 38 includes an uplink operating band of 2570-2620 MHz and a downlink operating band of 2570-2620 MHz, and wherein the band 40 includes an uplink operating band of 2300-2400 MHz and a downlink operating band of 2300-2400 MHz, and wherein the band 42 includes an uplink operating band of 3400-3600 MHz and a downlink operating band of 3400-3600 MHz.

14. The wireless apparatus of claim 13, wherein the RF unit is configured to limit the maximum level of the spurious emission to −27 dBm for protecting a band 26 including an uplink operating band of 814-849 MHz and a downlink operating band of 859-894 MHz.

15. The wireless apparatus of claim 13, wherein the RF unit is configured to limit the maximum level of the spurious emission to −37 dBm for protecting a band 28 including an uplink operating band of 703-748 MHz and a downlink operating band of 758-803 MHz.

\* \* \* \* \*